US011093935B2

United States Patent
Vityaz

(10) Patent No.: US 11,093,935 B2
(45) Date of Patent: Aug. 17, 2021

(54) SYSTEM AND METHODS FOR A RESOURCE-SAVING EXCHANGE PROTOCOL BASED ON TRIGGER-READY ENVELOPES AMONG DISTRIBUTED NODES

(71) Applicant: Oleksandr Vityaz, Dnipro (UA)

(72) Inventor: Oleksandr Vityaz, Dnipro (UA)

( * ) Notice: Subject to any disclaimer, the term of this patent is extended or adjusted under 35 U.S.C. 154(b) by 430 days.

(21) Appl. No.: 16/134,929

(22) Filed: Sep. 18, 2018

(65) Prior Publication Data

US 2019/0019182 A1    Jan. 17, 2019

Related U.S. Application Data

(63) Continuation-in-part of application No. 15/268,802, filed on Sep. 19, 2016, now abandoned, and a continuation-in-part of application No. 15/077,626, filed on Mar. 22, 2016, now abandoned.

(60) Provisional application No. 62/221,124, filed on Sep. 21, 2015, provisional application No. 62/137,079, filed on Mar. 23, 2015.

(51) Int. Cl.
*G06F 16/23* (2019.01)
*G06Q 20/38* (2012.01)
*G06Q 20/10* (2012.01)

(52) U.S. Cl.
CPC ....... *G06Q 20/382* (2013.01); *G06F 16/2379* (2019.01); *G06Q 20/102* (2013.01)

(58) Field of Classification Search
CPC .............. G06F 16/2379; G06Q 20/382; H04L 63/0428; H04L 67/10
See application file for complete search history.

(56) References Cited

U.S. PATENT DOCUMENTS

| | | | |
|---|---|---|---|
| 7,546,629 B2 * | 6/2009 | Albert | H04L 12/2856 709/223 |
| 7,627,631 B2 | 12/2009 | Belvins | |
| 7,706,741 B2 * | 4/2010 | Patel | H04H 60/27 455/3.05 |
| 8,671,130 B2 * | 3/2014 | Sinha | H04W 4/12 709/200 |
| 8,688,972 B2 | 4/2014 | Patrick et al. | |
| 9,098,455 B2 | 8/2015 | Atluri et al. | |
| 9,418,263 B2 | 8/2016 | Butler et al. | |

(Continued)

*Primary Examiner* — Merilyn P Nguyen
(74) *Attorney, Agent, or Firm* — Patent Ventures, LLC

(57) ABSTRACT

Disclosed is a resource-saving exchange protocol based on a safe transfer of envelopes among distributed nodes. The method comprises the steps of: authoring an envelope at an origin node, said envelope comprising at least a letter and a trigger card, wherein said letter is any one of an execution algorithm and said trigger card is any one of an event or algorithm that starts the execution of a logic; launching said envelope into the distributed network of nodes, whereby the envelope is transferred from at least one run-node to at least a second run-node according to an embedded exchange logic for safe transfer; checking the trigger from at least one envelope at least once by each run-node and transferred further if the trigger is not met and disabling trigger checking functionality of any one of nodes not actively checking for triggers to save resource, and analyzing the envelopes content upon trigger being fired to learn which run-node is eligible to execute the main logic of the envelope (execute-node).

19 Claims, 24 Drawing Sheets

(56) References Cited

U.S. PATENT DOCUMENTS

| | | | |
|---|---|---|---|
| 9,860,688 B2 | 1/2018 | Kulkarni et al. | |
| 10,057,723 B2 | 8/2018 | Kulkarni et al. | |
| 10,681,490 B2 | 6/2020 | Kulkarni et al. | |
| 2009/0287837 A1* | 11/2009 | Felsher | G06Q 10/10 |
| | | | 709/229 |
| 2010/0146582 A1* | 6/2010 | Jaber | G06F 21/6218 |
| | | | 726/1 |
| 2017/0346854 A1* | 11/2017 | Kumar | H04W 12/02 |
| 2018/0117446 A1* | 5/2018 | Tran | A42B 3/0433 |
| 2018/0330293 A1 | 11/2018 | Kulkarni et al. | |
| 2019/0098010 A1* | 3/2019 | Hebron | H04L 63/10 |
| 2019/0205541 A1* | 7/2019 | Zimny | G06F 21/575 |

\* cited by examiner

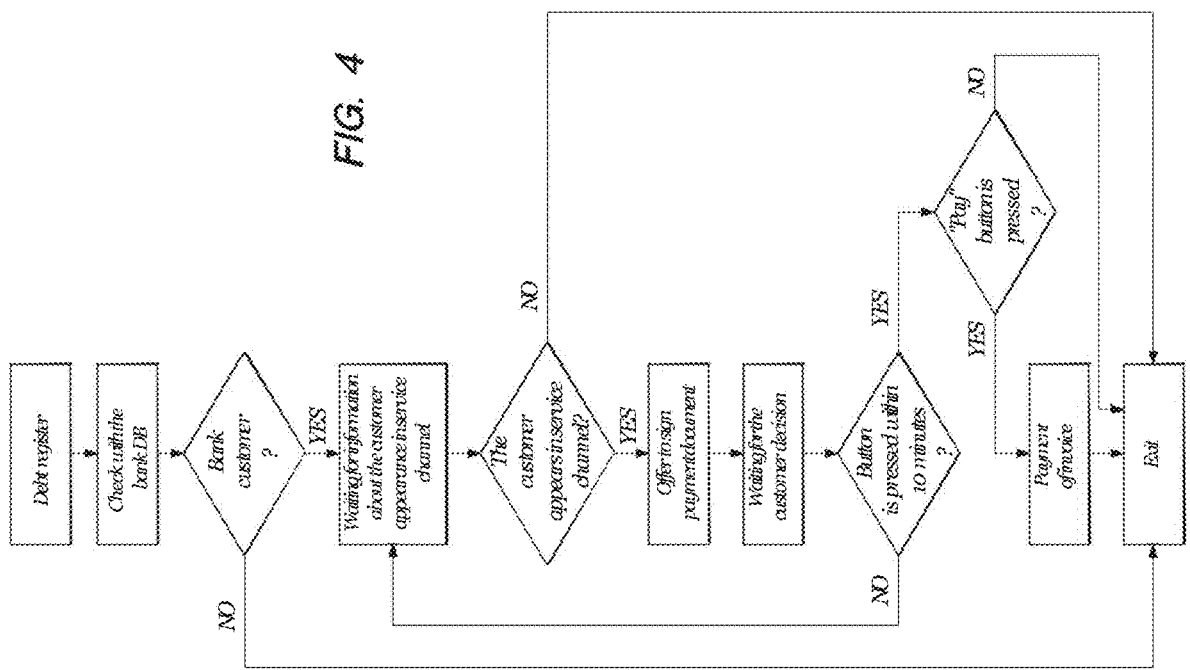

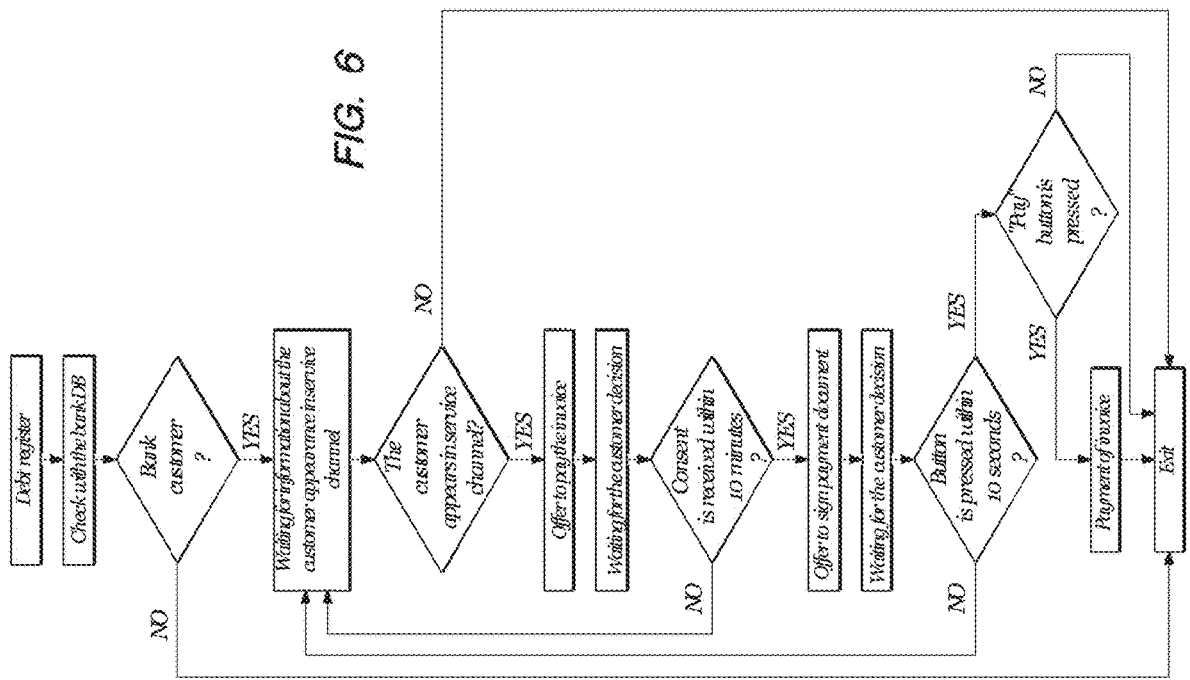

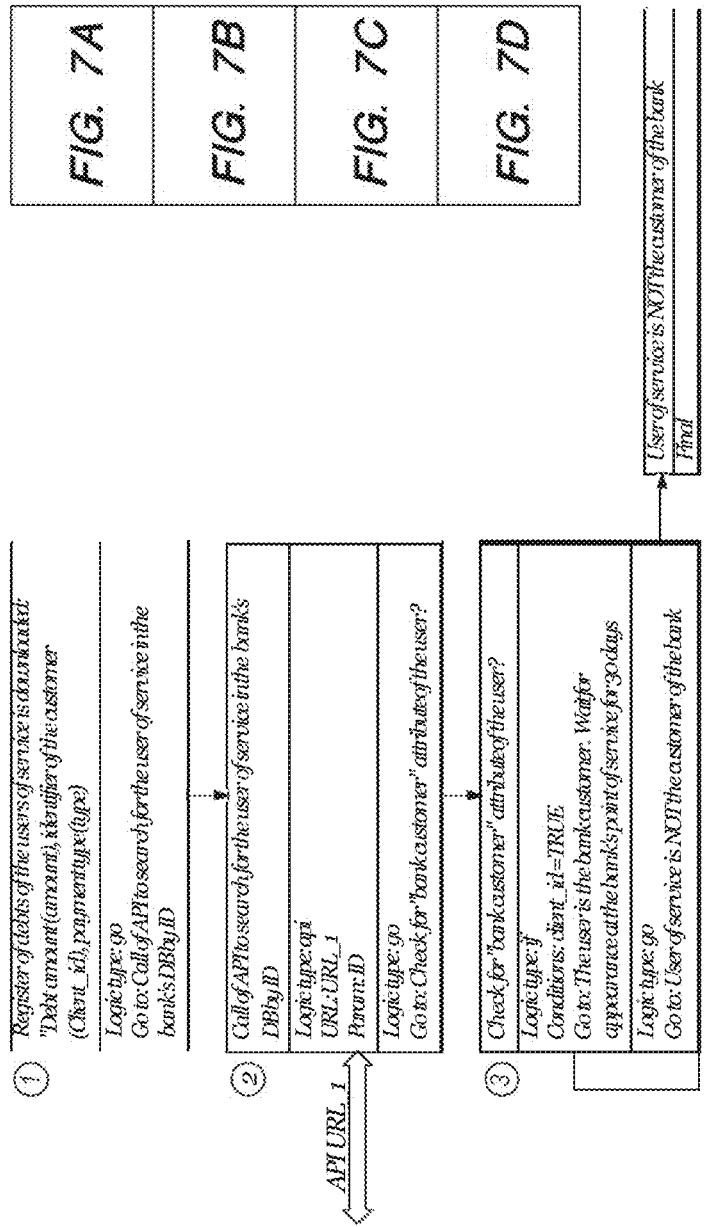

SYSTEM AND METHODS FOR A RESOURCE-SAVING EXCHANGE PROTOCOL BASED ON TRIGGER-READY ENVELOPES AMONG DISTRIBUTED NODES

CROSS-REFERENCE TO RELATED APPLICATION

This application claims priority to U.S. application Ser. No. 15/268,802, "Method of Binding Data and Processes with the Use of Universal Computing Elements", which claims priority to 62/221,124, filed on Sep. 21, 2015, which is incorporated herein by reference. Furthermore, this application also claims priority to U.S. application Ser. No. 15/077,626, "Universal Computing Element (UCE) and the Mode of Computing with the Use of UCE", which claims priority to 62/137,079, filed on Mar. 23, 2015.

FIELD OF INVENTION

The invention pertains generally to the field of digital communications, and more particularly to a node-based network, whereby an exchange protocol based on a safe transfer of envelopes among distributed nodes and executed upon a triggered event is enabled.

BACKGROUND OF INVENTION

Conventional electronic databases provide limited functionality, especially as advanced network access to data increasingly requires higher speed storage and access, as well as more complex data formats. For example, there is increasing need for providing higher intensity of data flow, instant availability of data storage, support of incompatible data formats, as well as various changes in data processing. Due to growing complexity of data processing, data processing becomes more time-consuming, thus complicating the process of making changes thereto, and requires higher professional skills of developers to build and modify more complex data systems that more flexibly allow organized online interaction between large number of various system applications.

Conventional computer-implemented design systems provide software tools which often encounter practical problems in software development. They tend to be too long, expensive, inflexible. Additionally, there is a high cost to perform updates, an increasing dependence on the developer—not to mention a whole host of developer problems (e.g., modern programming with implicit selection of status resulting in inherent technical problems, succession/inheritance, etc.). Thus, it would be desirable to address such conventional problems to improve computer programming and software development. There is currently a void in the market for an all-in-one toolkit for non-coders to build a customizable automated task loop that reduces computational load by distributing a logical circuit across nodes, wherein there is a perpetual transfer of objects across said nodes until a state change occurs ending the task loop.

Parallelism is the preferred way of increasing computer processing speed. Single-Instruction Multiple-Data (SIMD) architecture, in which the same program is applied to separate sets of data at the same time, has limited applicability because it requires that all data be processed in the same way. On the other hand, a Multiple-Instructions Multiple-Data (MIMD) architecture allows for separate programs to work on separate sets of data at the same time. The separate programs cooperate to solve a problem, but as more and more programs are added to the system, coordination becomes difficult. Inventors Richard E. Morley, et al. have developed a real-time systolic, multiple-instruction single-data (MISD) parallel computer system which allows for high speed real-time operation. The system comprises a plurality of separate processor cells running simultaneously to execute their respective program instructions. However, the MISD system has its own limitations. First and foremost, there is no guarantee of safe transfer of data. Data must be transferred between processor cells without loss or corruption. Furthermore, as a single-data computing system, there is a limited amount of data that can be analyzed and executed at a given time. Thus, the need for a successful method which would allow processor cells to check data concurrently still remains.

Eric Lawrence Barsness et al. have invented a method for real-time data replication for query execution in a massively parallel computer. This invention is meant to increase query processing parallelism by utilizing a group of compute nodes, each of which stores a portion of data as part of the in-memory database. Queries are assessed to determine whether portions of in-memory should be duplicated to allow multiple elements of the query to be evaluated in parallel. As such, the data records stored on the first compute node can be copied to a second compute node, with both computing nodes issuing respective results. This parallel system is comprised of hundreds, if not thousands, of processors. Such systems are highly useful for a broad variety of applications including financial modeling, quantum chemistry, weather modeling and prediction, and more. However, coordination of so many processors after tasks have been divided amongst nodes for parallel processing is extremely complex. There remains a void for a resource-conserving method involving a continuous movement of tasks between processing nodes, where the algorithm is only executed when triggered. Barsness does not teach any other resource saving features, such as disabling certain functionality involved in the transfer scheme in a selective fashion.

Howard T. Liu et al. have invented a dynamic resource allocation scheme for distributed heterogeneous computer systems. In this system, the nodes in the distributed network each have a queue containing jobs to be performed. In effort to optimize job performance, the tasks are ordered and addressed according to their workload value. Workload value is calculated as a function of the number of jobs on a node's queue. While this system is geared towards resource conservation, it does not save resources by any particular resource saving feature (such as selective disabling) beyond the network configuration. Additionally, Liu does not guarantee safe transfer of data. A maintenance-free exchange system is needed. Users must be able to communicate with confidence, knowing that their data is encrypted, while also assured that the data is incorruptible.

Existing methods of computing are based on a sequential execution of tasks and server implementation. Such methods are deficient due to the complexity of their architecture, limited scaling, expensiveness, pseudo-parallelism and pseudo-real-time computing. Their complexity, while expanding the range of computing capability, is also cumbersome. There is a void in the market for a resource-saving exchange protocol with safe transfer features that are based on trigger-ready envelopes transferring among distributed nodes.

SUMMARY

The invention automates data processing flow as a set of system states, particularly whereby data and processes are bound using universal computing elements (UCE), as finite-state automata with explicit selection of states in real-time operation, thus facilitating construction of finite-state automata/processes to users. For example, data flow is processed as a set of system states significant for a given process purpose. Preferably for such purpose, data and processes are provided as finite-state automata automatically with explicit selection of states in real-time operation, thereby enabling automata-based construction of finite-state automata or processes, for example, for users who are not programmers. Advantageously, data processing is organized to reduce impact of inefficient conventional data usage, particularly via data transfer processed innovatively into state format and usage of automata-based programming for data processing.

It is contemplated generally herein that computer-implemented systems/methods enable computer programming and software development using a node architecture, whereby at least one of a software, computer program, source/object/assembly code, firmware or other reconfigurable logic or signal processing instructions include at least one node. For example, UCE-bound data and processes in a node-configured software program or functionally equivalent reconfigurable hardware may be implemented programmably in general-purpose cloud operating system function according to related or unrelated algorithms, as well as for one and/or more owners, whereby such software runs on server or cloud, (private, public, or hybrid,) and/or hardware via firmware, micro-circuit, board, or equivalent functional logic, in order to achieve construction of finite-state automata/processes to users.

It is one object of the claimed invention to claim and disclose a system and method for at least one finite-state process for enabling an automated task flow, the system and method comprising the steps of: listing of necessary states significant for a data processing; determining data parameters used for designation of necessary states; assembling a data structure and a process (object) corresponding to information about at least one necessary state significant for the process; and running the process involving movement of objects from one node to at least a second node for a perpetual run until a condition with a set of parameters are met by an event, ending the task loop.

It is another object of the invention to disclose and claim a system and method for constructing at least one finite-state process for enabling an automated task flow comprising: a list of states significant for a data processing; determination of data parameters used for designation of necessary states; an assembly of a data structure and a process (object) corresponding to information about at least one necessary state significant for the process; and a process run involving movement of objects from one node to at least a second node for a perpetual run until a condition with a set of parameters are met by an event, or at least one of a counter and run-time threshold is met, thereby achieving computational load efficiencies and task-overflow avoidance.

Embodiments of the present invention generally relate to parallel real-time computing, and more particularly to a resource-saving exchange protocol. The present invention fills a void left behind by the currently existing methods of computing by organizing a distributed computational method. Tasks are divided in such a way where they are executed only when triggered. Continuous movement of the task throughout the distributed network reduces computational load and increases efficiency. Furthermore, the content is encrypted, allowing for the safe transfer of information which is only decrypted upon execution.

The main idea of the present solution is to distribute computational tasks. The distributed network is comprised of specialized nodes, designated to author, launch, check, or analyze tasks. This enables unlimited-capacity event-triggered algorithm processing. The constant flow of data through the distributed network occurs without loss, corruption or alteration. There is no centralization point, so users cannot be pinpointed or shut down. Contact is direct between users and the absence of logs makes it impossible to trace data. Therefore, message exchange, data sharing, and search and retrieval of content can be safely conducted within the network.

The present invention utilizes existing hardware, with almost no minimum requirements. A multitude of events can be processed within the network without the need for specialized hardware. Thus, computing devices such as mini-computers, notebooks, routers, smart-devices, etc. can be included in the network. Even more importantly, the invention is compatible with any device that has a supported processor. This enables the creation of a vast network in which devices can find each other without any prior knowledge about one another. Conditions of a traditional server network can be replicated without the use of any actual servers; internet connection is the only requirement. Finally, the main module of the invention is universal across devices and can be installed on any supported machine. The solution is endlessly expandable, safe, and stable without any points of failure or security or legal risks.

It is one object of the invention to disclose a resource-saving exchange protocol based on a safe transfer of envelopes among distributed nodes. In this method, a node is any processor-enabled device. An envelope is authored at an origin node. Each envelope contains at least a letter and a trigger card; a letter is any one of an execution algorithm and a trigger card is any one of an event or algorithm that starts the execution of a logic. The triggers are created with standard or customized coded logic. The envelope is launched into the distributed network of nodes, whereby the envelope is transferred from at least one run-node to at least a second run-node according to an embedded exchange logic for safe transfer. Next, the trigger from at least one envelope is checked at least once by each run-node and transferred further if the trigger is not met. A node checks any number of envelopes concurrently, and any one of the nodes not actively checking for triggers is disabled to save resource. Finally, upon the trigger being fired, the envelope's content is analyzed to learn which run-node is eligible to execute the main logic of the envelope (execute-node). This only occurs once the trigger content and envelope integrity are checked. Furthermore, the run-node eligible to execute the main logic of the envelope is dynamic based on network or envelope properties, and is pre-determined by at least one user or trusted authority.

In a preferred embodiment, the envelope contains at least a trigger and a letter. A trigger is an event or algorithm that starts the execution of main logic, and a letter is a main execution algorithm of any complexity. These are combined to be launched into the network and processed according to the logic within.

In a preferred embodiment, the envelope also contains a stamp. A stamp is a cryptographic envelope identifier that ties it to a payment made to the network for processing this logic.

It is a further object of the invention that there be an envelope exchange logic embedded in every node. This allows for safe envelope transfer between independent nodes without loss, corruption or denial-of-service related events.

In this system, any node not checking the trigger of at least one envelope is momentarily disabled until at least one envelope arrives or returns for the trigger check.

In a preferred environment, a node checks the trigger of at least one envelope only once prior to transferring it to the next node.

This system involves an envelope transfer scheme employing a triangulation algorithm to ensure safe transfer of envelopes from node to node. In this system, the envelope transfer scheme increases transfer stability as the number of nodes increase.

It is a further object of the invention that a node contains a public key identifier to locate or verify any sending or receiving node or envelope exchange in any given transaction. Also, the exchange protocol is associated with a smart contract, wherein each exchange is executed independently with no alteration or suspension of the main envelope logic.

This computing approach functions as a distributed messenger system and a distributed document exchange system. There is a distributed registry for storing, reading, and writing arbitrary data into a network.

These and other features and improvements of the present application will become apparent to one of ordinary skill in the art upon review of the following detailed description when taken in conjunction with the several drawings and the appended claims.

BRIEF DESCRIPTION OF FIGURES

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIG. 4 illustrates invoice-payment algorithm of one method flow chart automated steps of solving task set an example by creating finite-state automaton with two states, according to one or more aspect of the present invention.

FIG. 6 illustrates invoice payment process algorithm flow chart of one method of automated steps solving the task set in the example by creating the finite-state automaton with three states, according to one or more aspect of the present invention.

FIG. 7a illustrates schematically method flow chart layout of Universal Computing Element system automated steps, which allows solving the task set in the example by creating the finite-state automaton with three states according to the algorithm stated above, according to one or more aspect of the present invention.

DETAILED DESCRIPTION

Figure 1:
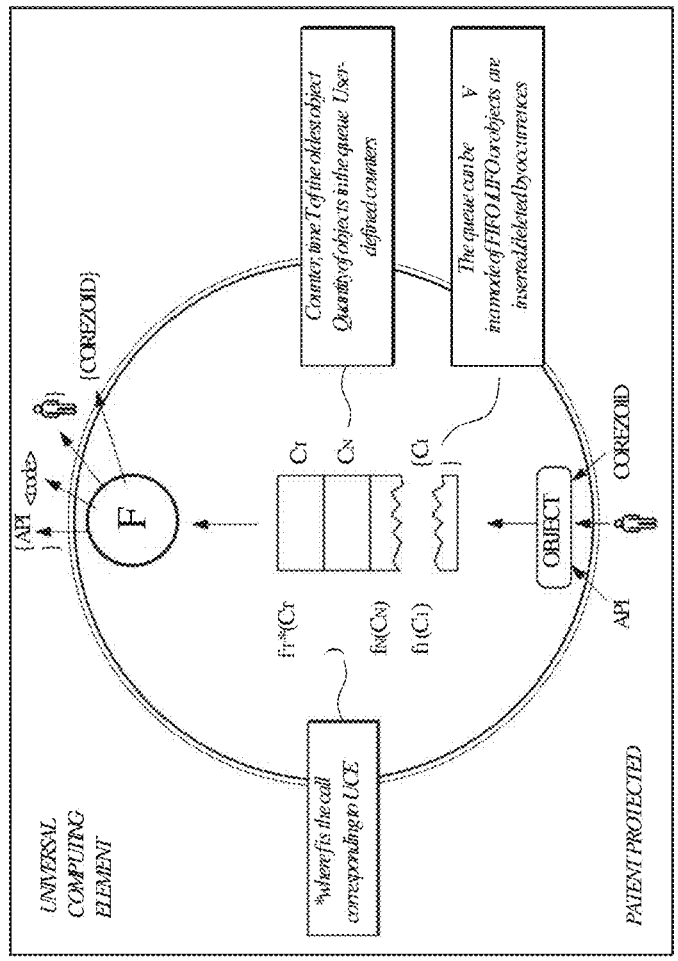
FIG. 1 illustrates Universal Computing Element (UCE or COREZOID) structure schematically, according to one or more aspect of the present invention.

The invention automates data processing flow as a set of system states, particularly whereby data and processes are bound using universal computing elements, as finite-state automata with explicit selection of states in real-time operation, thus facilitating construction of finite-state automata/processes to users. For example, data flow is processed as a set of system states significant for a given process purpose. Preferably for such purpose, data and processes are provided as finite-state automata automatically with explicit selection of states in real-time operation, thereby enabling automata-based construction of finite-state automata or processes, for example, for users who are not programmers.

Generally, it is contemplated herein that computer-automated software method and/or hardware system binds and constructs data and process electronically using universal computing element, whereby data and process associated with a first data processing flow are bound electronically, wherein such data and process are bound using one universal computing element(s) corresponding to system state(s) significant to the data processing flow. Finite-state automata or process may be constructed automatically to facilitate real-time operation of the data processing flow according to such universal computing element(s) via explicit selection of such system state(s). Advantageously, data processing is organized to reduce impact of inefficient conventional data usage, particularly via data transfer processed innovatively into state format and usage of automata-based programming for data processing.

In accordance with one embodiment of the present invention, data is processed per following automated steps:
(1) company data (both found in databases and formed in the course of the company activity without storing as the records in databases) is transformed automatically into finite set of states with the use of the Universal Computing Element;
(2) in the course of data processing in one or more Universal Computing Elements, source data is not sent; instead, parameters required for the processes are sent automatically, and whenever necessary confidential information is replaced automatically by its identifiers;
(3) automata-based programming by adding of new Universal Computing Elements (automata) is used automatically for data processing; and
(4) data is exchanged automatically between units "inside" the diagram of the process and between external sources of data, including other units "external" with regard to current process diagram of the units; therefore, flexible and easy integration is provided.

Thus, users are automatically provided processing environment wherein data converted into more convenient form, whereby such environment provides for processing more efficiently in terms of finite-state automata. Preferably, users cannot process data not in the mode of automata, such that data transferred in this environment is automatically converted into the set of finite states always for generating resulting processes. Furthermore, processes running in this environment may generate new states also in such automata mode. Advantageously, data processing system configured automatically according to such automata-based programming environment provides opportunities for flexible expansion and constructing stable controllable links to integrate with other network computing systems.

In accordance with one or more aspect of the present invention, one or more Universal Computing Element (UCE or COREZOID) is provided for automatic configuration, as shown schematically in FIG. 1, with one or more of the following structural functions, programmable attributes, or characteristic definitions or nomenclature:

queue—queues of objects in the unit;
semaphores—system and user semaphores; when certain values are reached, semaphore triggers parallel process of escalation;
counters—system and user counters; counter may shows the value only, without action (this is how counters differ from semaphores);
system semaphore T—specified time of the object staying in the unit;
system semaphore N—specified number of objects that can be queued in the unit;
other parameters—which can be specified for objects queued in the unit;
functions—actions to be performed on the object from the queue in the unit; also
functions—actions to be performed on the object from the que in the unit; also, functions can be in the form of API, software code, other conveyor etc.; when specified values of semaphores and/or functions are violated (exceeded), escalation is triggered (can be arranged with the use of conveyor as well) accepting the objects for processing;
$f$—call of relevant function, unit(i);
F—for each unit there is a corresponding function which can be realized through operator, API, code, other unit;
Cm—counter, time T of the oldest object in queue
Cn—number of objects in queue
{Ci}—custom counters
object—set of parameters characterizing the object; according to certain rules, data on the object is processed in the unit—function is applied to the object;
functions—actions to be performed on the object from queue in the unit; functions can be in the form of API, software code, other process etc.;
logic—tools for controlling logic in the unit; system and use logics;
system logic T—specified time of the object staying in the unit;
system logic N—specified number of objects that can be queued in the unit;

For optimization purposes in large systems, counters may be run or accessed on separate servers in a network.

Figure 2:
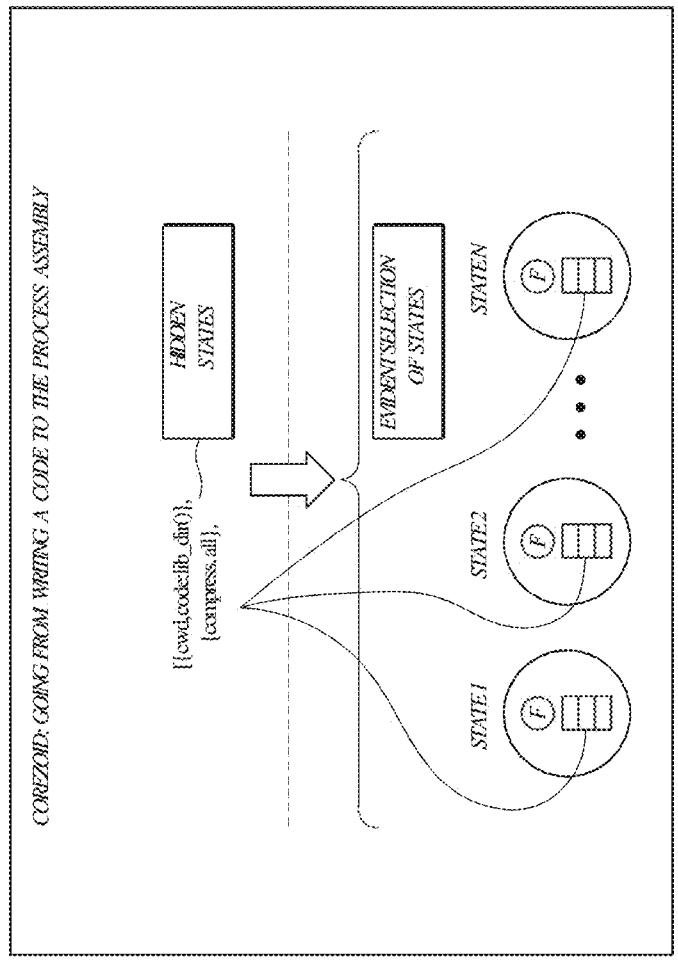
FIG. 2 illustrates process assembly of Universal Computing Element (UCE or COREZOID) schematically showing steps to transform data into information about states using system assembled with UCE/COREZOID, according to one or more aspect of the present invention.

In one embodiment of the present invention, CALLBACK logic is used as basic logic element in the Universal Computing Element. For example, CALLBACK may be used for asynchronous interaction with external API and other processes, such as request when gets to the unit with CALLBACK "hands up" and waits for update from external system of other process. Owing to CALLBACK logic, processes created with the use of the Universal Computing Elements can operate in the mode of finite-state automata, as shown in FIG. 2.

Regarding operation of the Universal Computing Element, generally such unit structurally in hardware, firmware, and/or software embodied using one or more processor, computer, controller, etc., comprises one or more queues, one or more counters, one or more queues, one or more functions from counters (e.g., semaphores), as well as functions applied to queued objects. Initially, information about one or more object may be transferred automatically to the unit queue input (i.e., object identifier—Oi). Such queue may be configured and/or described by standard semaphores and/or counters, e.g., semaphores of time, quantity, etc.

Moreover, according to pre-determined or modified rules and/or parameters, data on one or more object is processed in the UCE unit, i.e., the function is applied to such object. Application of function to such object preferably has defined limitations on time and quantity. Also, such functions can be realized through API, code, conveyor, operator, etc. After successful processing of object data, the unit delivers results for further processing to other units, or processing is completed. In case of deviation from normal operation of the unit (e.g., processing time exceeded, more objects in queue which are waiting for processing, etc.), the unit triggers escalation (e.g., escalation algorithm may deploy additional units). Escalation parameters and conditions can be extended based on needs of one or more algorithm.

In particular, one embodiment of present invention includes one or more operational method steps for data transformation automatically, as follows:

Step 1. Determination of list of system states significant for data processing;

Step 2. Determination of data parameters used for designation of necessary states;

Step 3. Development of process algorithm for data processing;

Step 4. Designing of Universal Computing Element layout which provides for implementation of the process algorithm;

Step 5. Setting of parameters sent to system and between Universal Computing Elements within the diagram, when units with CALLBACK logic are included into parts of process where system should stop waiting for next event significant for the process. Upon occurrence of one of significant events, system may continue processing of information according to basic diagram to next UCE with CALLBACK logic or final UCE according to the diagram, e.g., go to the next state. If the event significant for the system is expiry of specified waiting time, it is possible to use (i.e., instead of CALLBACK logic) the system semaphore T which turns system to next state upon occurrence of the event, i.e. expiry of specified waiting time.

Step 6. Sending flow of data to be processed to input of diagram assembled of the Universal Computing Elements.

Step 7. Presence of created system of units with CALLBACK logic in the basic diagram leads to mode of data processing, when after each or some significant event, system goes into new significant state and stays in it for a specified time until next significant event occurs.

Step 8. Since each Universal Computing Element may process, obtain and transfer data both to internal and external (i.e., with regard to the process diagram) units, movement of the request (e.g., single set of data about the event in the system) from one unit to another according to the process algorithm and diagram may lead to changing a number of states (e.g., copying, modification, etc.) instead of one state, and initiate new processes built on the same principles.

In one embodiment regarding automated payment of invoices of individuals for services, one or more bank institution based on contracts with service providers (e.g., utility company, telecommunication company, etc.) may receive database on residents' debts for services of such provider company automatically to arrange acceptance of payments from these individuals. Optionally, such provider bank provides individuals opportunity to find out actual amount of their debt and pay invoice issued by the company by any convenient means automatically, e.g., at the bank branch, ATM, through Internet client-bank system, smartphone application, or any other available means. However, conventional invoice payments by individuals are unreliable, for example, since individuals may need to make a request to the database on the amount of bank debt, and initiate payment knowingly; hence, individuals may forget to pay in time or permanently defer their payments altogether, and as a consequence, cash inflow to service provider is reduced significantly. Additionally, customer may routinely contact bank on other transactions, e.g., deposit, transfer receipt, loan servicing, etc., during which customer may pay invoices, i.e., if such customer considers payment then conveniently.

Thus, advantageously according to one or more aspect of the present invention, automated provision of computer-implemented steps facilitates timely receipt of money by service provider and simplifies procedure of individual invoice payment due to more convenient payment procedure, for example, by eliminating necessity to give a request to the bank of the amount of debt. Preferably, automated invoice for payment of debt waits for customer in any channel of bank service. One automated embodiment of preferred provision of computer-implemented steps follows:

Step 1. Automatically create finite-state automaton with two system states; define the significant states of the system:
(1) Wait for bank customer in whose name invoice is issued at bank point of service, e.g., 30 days, until information on amount of debt is updated;
(2) Display and wait for payment of invoice to pay for services within 10 minutes (i.e., maximum time of contact with customer in bank's service channels).

Step 2. Define various parameters of data:
(1) Information about the service, e.g., type;
(2) Identifier of the individual, e.g., Client_id; and
(3) Amount of invoice for payment, e.g., amount.

Step 3. Develop the process algorithm for data processing, as shown in FIG. 4

Step 4. Design Universal Computing Element layout, as shown in FIG. 5.

By designing UCE unit layout, for example, system configured automatically such that after receiving data of specific request (i.e., information about debt of certain individual) at any time stay in mode of waiting for significant actions of bank customer automatically in one of the following states:
(1) Waiting for bank customer in whose name invoice is issued at bank point of service, e.g., 30 days, until the information on amount of debt is updated; and
(2) Waiting for pressing the "Pay" button by customer in response to bank offer to pay executed payment document, e.g., 10 minutes, maximum time of contact with customer in bank' service channel.

Optionally, such system configuration is arranged using CALLBACK logic in units 4 and 6 and system semaphore in units 4, 6.

Step 5. Setting parameters sent to the system and between Universal Computing Elements within the diagram. Request in the process shall be set of data described in Step 2.

Step 6. Sending data flow, e.g., table with data on amount of individual invoices sent to system input, as sequence of requests.

Step 7. Passing one or more request through diagram of the process (i.e., automaton units) results in "stopping" of data concerning each transaction in the unit corresponding to current state of the system; upon occurrence of event significant for the process (e.g., appearance of customer in service channel) system automatically goes to next state according to the algorithm and diagram of the process.

In another embodiment, data flow is transformed automatically into the automaton comprising three (i.e., instead of merely two) states, adding opportunity for customer to accept or refuse invoice payment, as follows:

Step 1. Create finite-state automaton with three system states; define significant states of the system automatically, as follows:
   (1) Waiting for bank customer in whose name invoice is issued at bank point of service, e.g., 30 days, until information on amount of debt is updated;
   (2) Waiting for customer decision in response to bank offer to pay invoice issued to customer, e.g., 10 minutes, average time of customer servicing at bank; and
   (3) Waiting for payment of invoice sent to customer after receiving customer consent to pay, e.g., 10 seconds, maximum period of invoice payment in the bank's service channels.

Step 2. Define various parameters of data:
   (1) Information about the service, e.g., type;
   (2) Identified individual, e.g., Client_id; and
   (3) Amount of invoice for services, e.g., amount.

Step 3. Develop the process algorithm for data processing, as shown in FIG. 6.

Figure 7B:
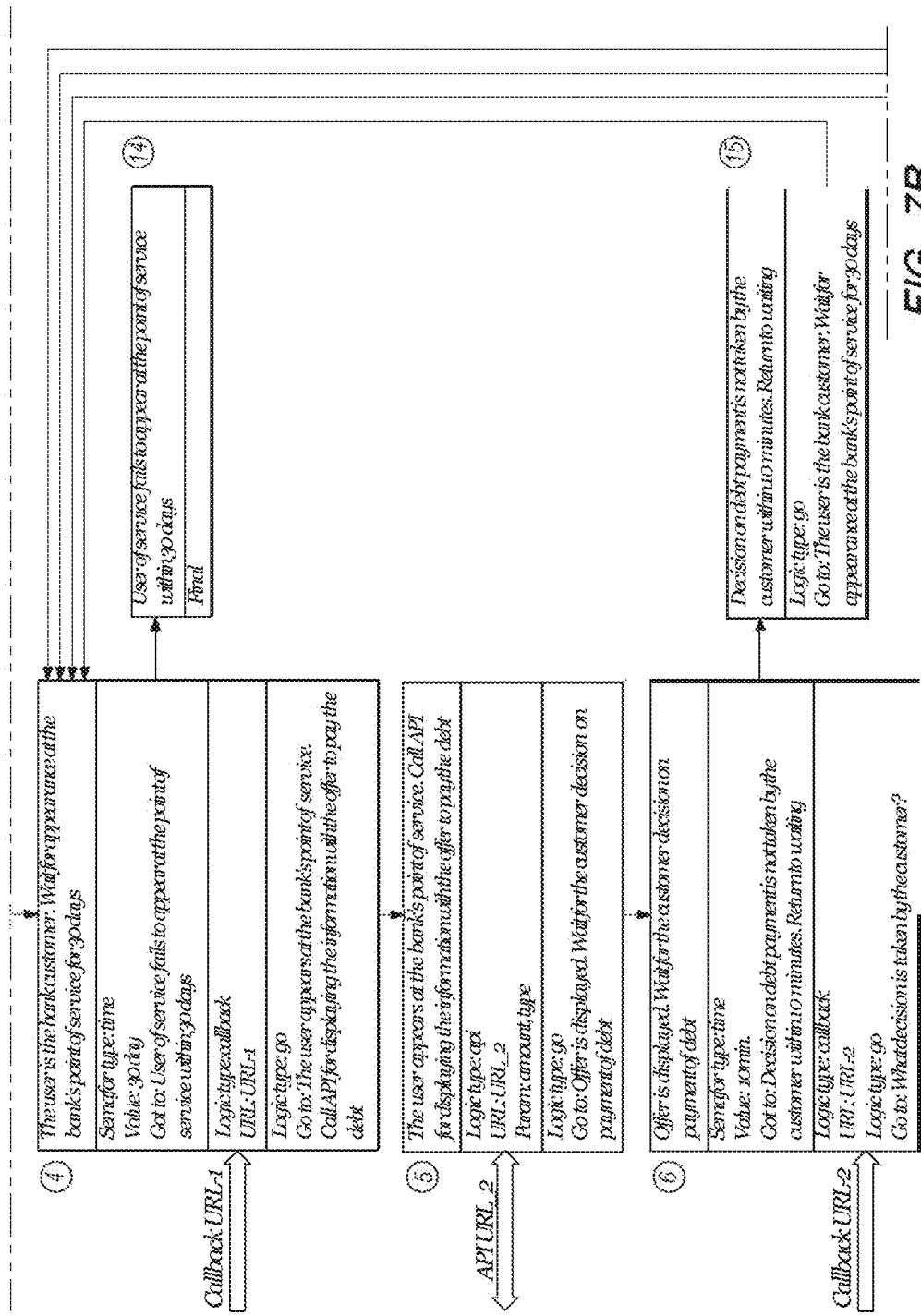
FIG. 7b illustrates schematically method flow chart layout of Universal Computing Element system automated steps, which allows solving the task set in the example by creating the finite-state automaton with three states according to the algorithm stated above, according to one or more aspect of the present invention.
Figure 7C:
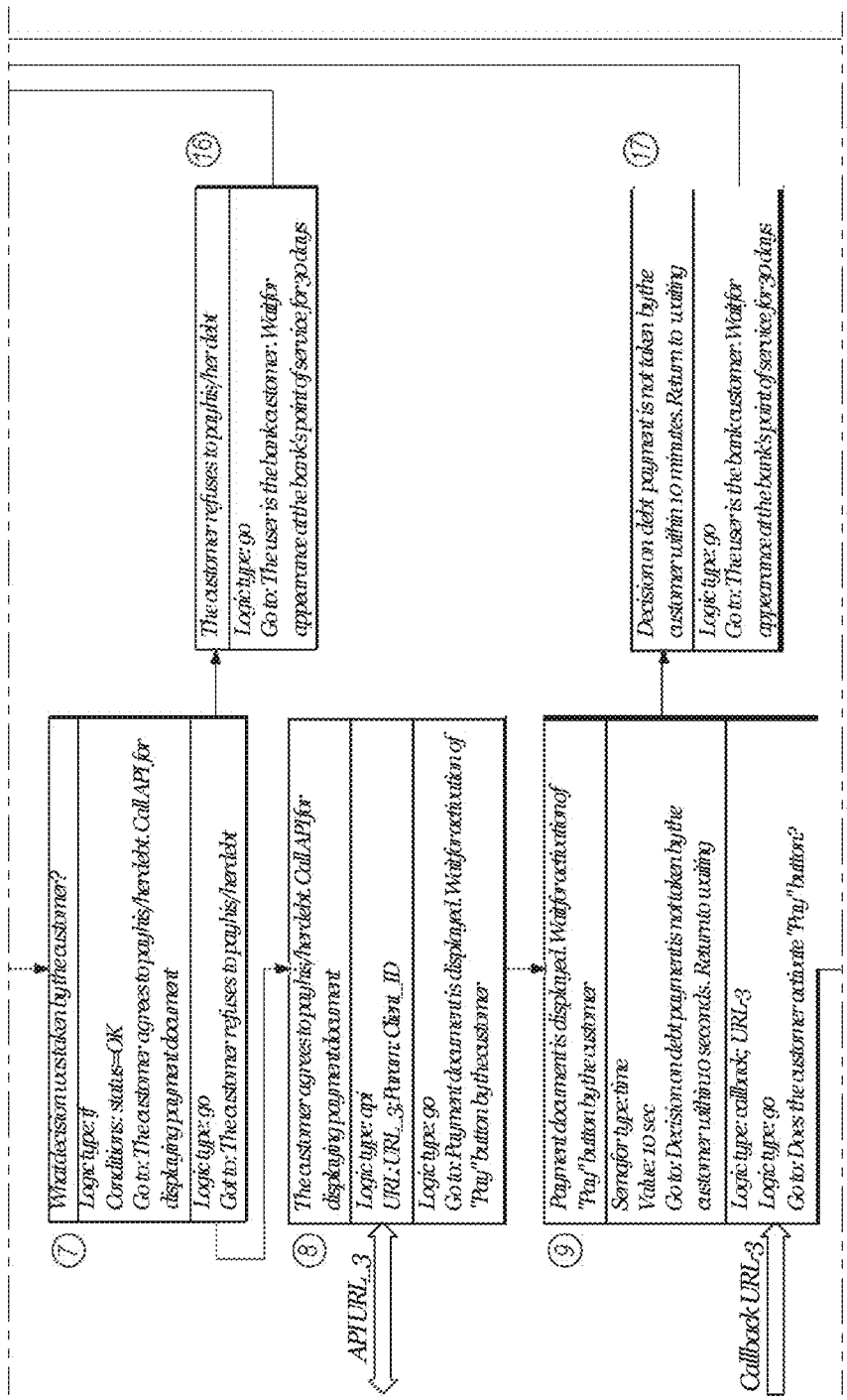
FIG. 7c illustrates schematically method flow chart layout of Universal Computing Element system automated steps, which allows solving the task set in the example by creating the finite-state automaton with three states according to the algorithm stated above, according to one or more aspect of the present invention.
Figure 7D:
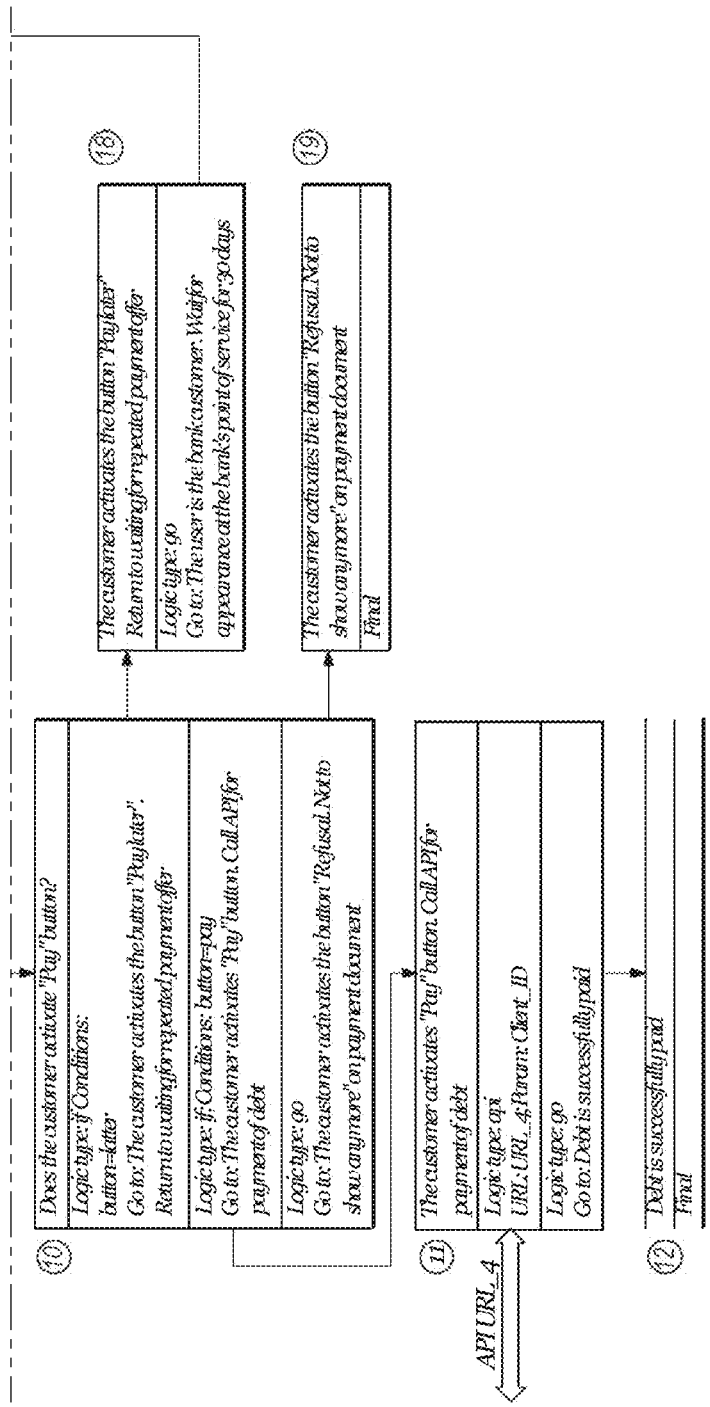
FIG. 7d illustrates schematically method flow chart layout of Universal Computing Element system automated steps, which allows solving the task set in the example by creating the finite-state automaton with three states according to the algorithm stated above, according to one or more aspect of the present invention.

Step 4. Designing layout of Universal Computing Elements, as shown in FIG. 7.

Regarding UCE unit layout design, it is contemplated herein generally to automate creating a system which after receiving data of request (e.g., information about debt of certain individual) at any time stay in mode of waiting for significant actions, for example, of bank customer in one of the following states:
   (1) Waiting for bank customer in whose name the invoice is issued at bank point of service, e.g., 30 days, until information on amount of debt is updated;
   (2) Waiting for customer decision in response to bank offer to pay invoice, e.g., 10 minutes; and
   (3) Waiting for pressing "Pay" button by customer in response to bank offer to pay executed payment document, e.g., 10 seconds.

Optionally, such system is arranged due to use of CALLBACK logic in units 4, 6 and 9 and system semaphores T in units 4, 6 and 9.

Step 5. Setting of parameters sent to the system and between Universal Computing Elements within the diagram; request in the process may be the set of data described in Step 2.

Step 6. Sending of data flow; table with data on amount of individual invoices is sent to system input, as sequence of requests.

Step 7. Passing of one or more request through the diagram of the process (i.e., automaton units) results in "stopping" of data concerning each transaction in the UCE unit which corresponds to current state of the system; upon occurrence of event significant for the process (e.g., appearance of customer in service channel) the system automatically goes to next state according to the algorithm and diagram of the process.

Generally, in accordance with one or more aspects of the present invention, it is contemplated that one or more embodiments automate a computer-implemented system and/or method in accordance with one or more of the following structural and/or programmable limitations, featured functionality, or descriptive notes:

(1) Multi-state automaton examples show various ways of solving system task using Universal Computing Elements, which differ accordingly by parameters of finite-state automaton being created.

(2) During data flow (e.g., list of debtors with indication of amount of debt) to input of the system, one or more automaton is processed automatically in one or more significant states, e.g., waiting for customer, for consent to pay, for payment, etc. (i.e., with regard to indebted customer).

(3) Construction of the system (e.g., automaton with three or two states) is carried out by constructing algorithm for data processing and subsequent implementation of the algorithm in diagram of element binding, comprising Universal Computing Element with one or more functions "active".

(4) Changing the algorithm of system operation is performed automatically according to change in structure and type of Universal Computing Element functions used.

(5) Interaction of created system with external systems is performed with use of API and/or CallBack functions (logics).

(6) Preferable system may be configured automatically in mode of waiting for information from external systems, and changes state upon receiving relevant data.

(7) Sequence of states hardly coded with the use of the algorithm and diagram automates transforming the data on states into processes which in their turn change state of the system, i.e., "States generate processes, and processes generate states".

(8) When system stays in mode of waiting for significant event, it results instantly in response of the system (i.e., instant availability of data) to such change.

(9) System constructed in this automated manner allows processing of data not compatible beyond its limits using API logic. Hence present method of data processing may enhance flexibility and complexity of systems considerably owing to possibility of combining and processing data of unlimited number of applications.

(10) The proposed method of system development substantially reduces cost of process of making changes into information systems. Changing the system (e.g., addition/removal of units, logics inclusion to/exclusion from a small set, connection/disconnection of links to external system addresses, etc.) may not require specialized programming skills.

Figure 3:
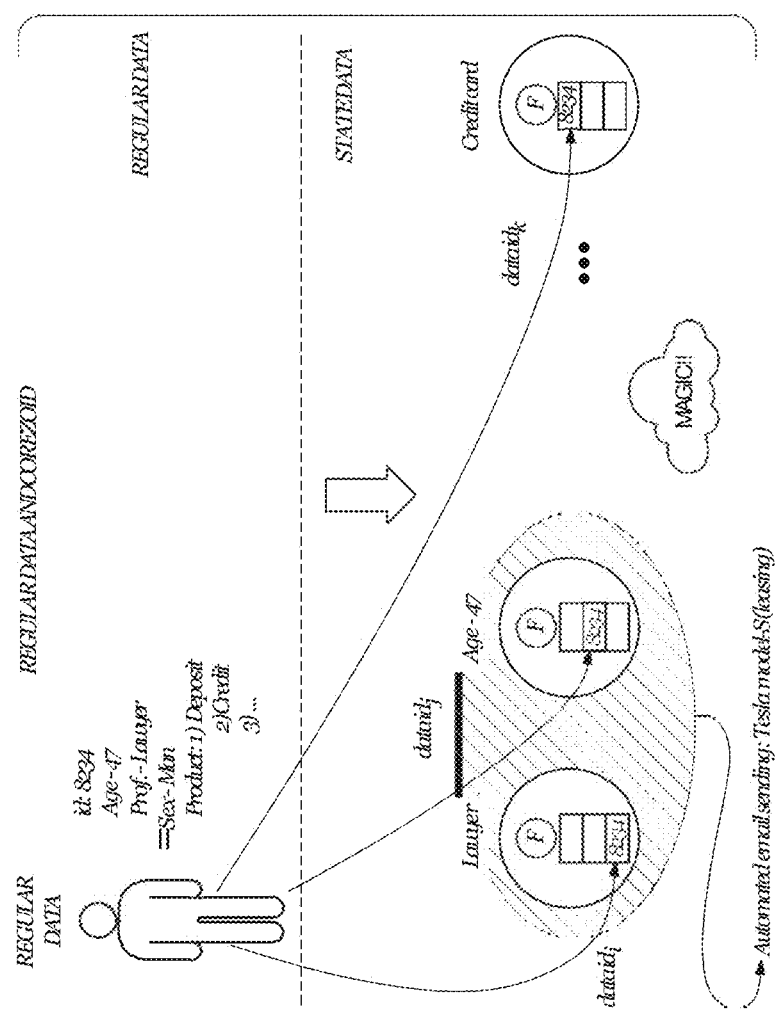
FIG. 3 illustrates binding data structures and information about states schematically, according to one or more aspect of the present invention.

FIG. 1 illustrates Universal Computing Element (UCE or COREZOID) structure schematically. FIG. 2 illustrates process assembly of Universal Computing Element (UCE or COREZOID) schematically showing steps to transform data into information about states using system assembled with UCE/COREZOID. FIG. 3 illustrates binding data structures and information about states schematically. For example, a set of customer historical data is shown to be collected electronically by a bank, and history of customer transactions is transformed automatically onto set of states significant for bank process flow, using data processing system assembled using Universal Computing Elements (UCE/COREZOID). As soon as the process, for which one state or several states are determined to be significant, appears at the bank, the system preferably changes state to next one, according to present process algorithm. FIG. 3 example shows lawyer, a man of 47 years old, having deposit and active credit card; owing to partner program between bank and Tesla car manufacturer, bank automatically makes special offer on buying the car of Tesla model-S on credit to all customers—lawyers at age of 47 years. At the time when the process of the offer sending is initiated, the system automatically determines compliance of the candidate with specified terms and creates new state in the system—"sending of Tesla model-S buying on credit" to the customer ID 8234. Situation when the promotional event started in the past, but the customer reaches the age of 47 years now, gives the same result (i.e., adding of a new state); thus changing "age" state results in change of "Tesla model-S offer" state.

Figure 5A:
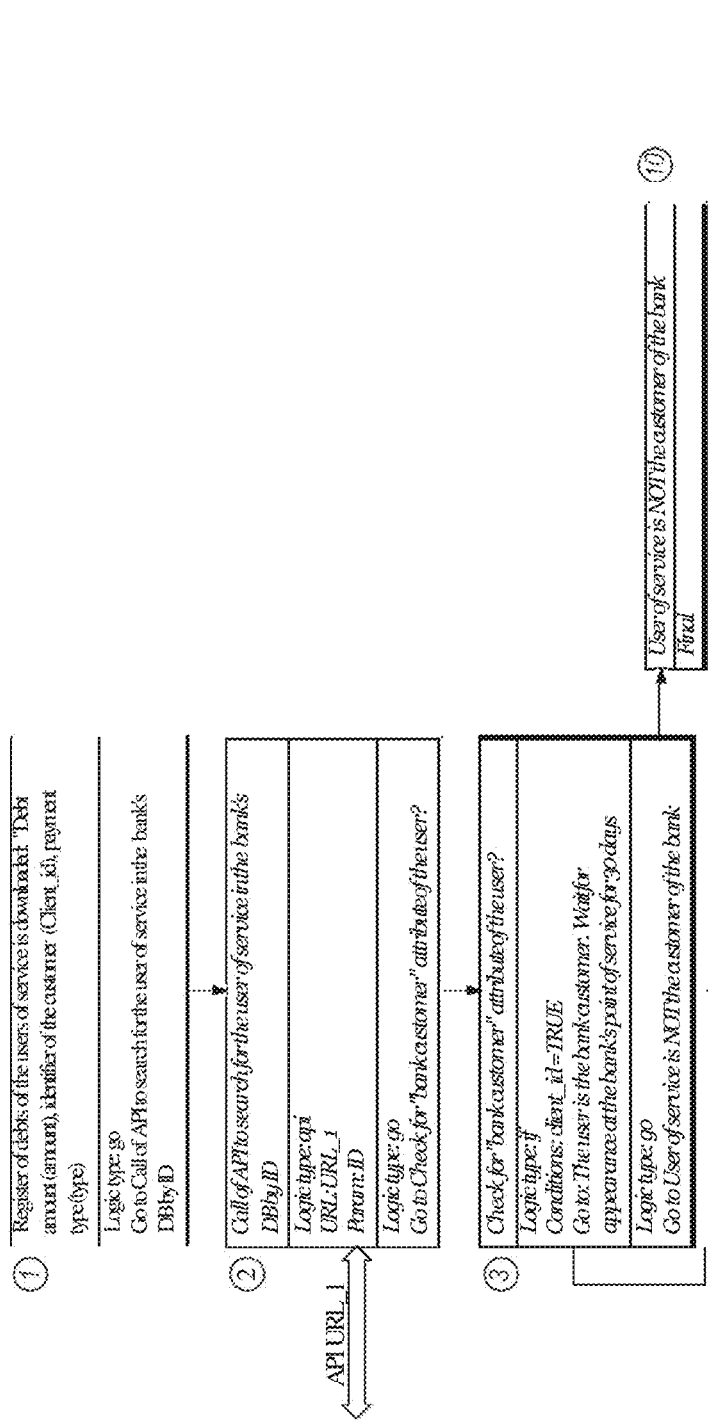
FIG. 5a method flow chart illustrates invoice payment process diagram schematically with layout of the Universal Computing Element system automated steps, which allow solving the task set in the example by creating the finite-state automaton with two states according to the algorithm stated above, according to one or more aspect of the present invention.
Figure 5B:
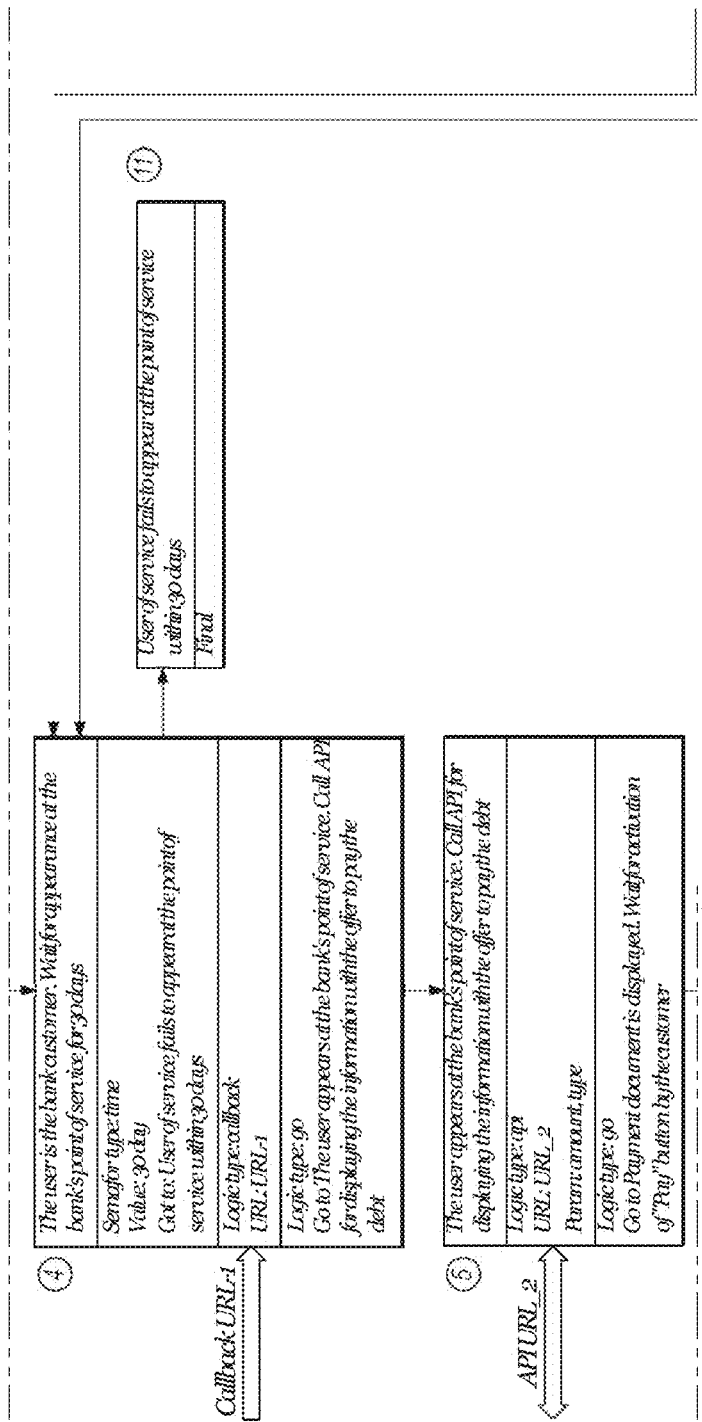
FIG. 5b method flow chart illustrates invoice payment process diagram schematically with layout of the Universal Computing Element system automated steps, which allow solving the task set in the example by creating the finite-state automaton with two states according to the algorithm stated above, according to one or more aspect of the present invention.
Figure 5C:
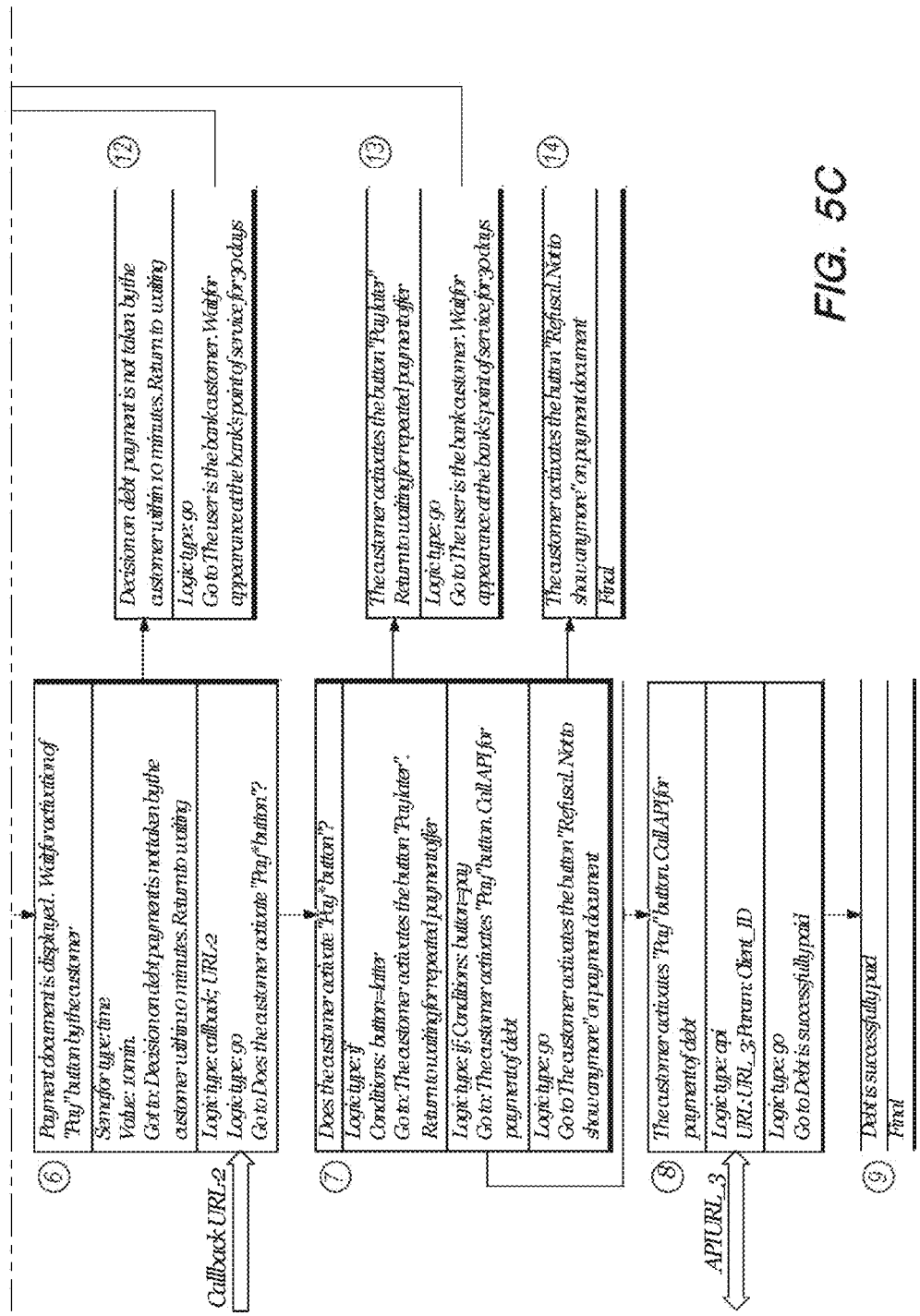
FIG. 5c method flow chart illustrates invoice payment process diagram schematically with layout of the Universal Computing Element system automated steps, which allow solving the task set in the example by creating the finite-state automaton with two states according to the algorithm stated above, according to one or more aspect of the present invention.

FIG. 4 illustrates invoice-payment algorithm of one method flow chart automated steps of solving task set an example by creating finite-state automaton with two states. FIGS. 5a-5c method flow chart illustrate an invoice payment process diagram schematically with layout of the Universal Computing Element system automated steps, which allow solving the task set in the example by creating the finite-state automaton with two states according to the algorithm stated above. As shown, bidirectional arrows define bidirectional data communication between created system of Universal Computing Elements with external systems by means of API application programs. According to working protocol, one or more parameters contained in request (e.g., type, Client_id, amount) sent from the system, and in response data on results of processing (e.g., customer or not, what button is pressed by the customer in the interface, etc.) is received. Moreover, as shown, unidirectional arrow defines unidirectional data communication between created system of Universal Computing Elements with external systems and/or other processes, assembled of Universal Computing Elements, for example, by using CallBack function. According to protocol of CallBack function, for example, request "hangs up" in Universal Computing Element, and waits for update from external system or other process.

FIG. 6 illustrates invoice payment process algorithm flow chart of one method of automated steps solving the task set in the example by creating the finite-state automaton with three states. FIGS. 7a-7d illustrate schematically a method flow chart layout of the Universal Computing Element system automated steps, which allows solving the task set in the example by creating the finite-state automaton with three states according to the algorithm stated above.

Figure 8:
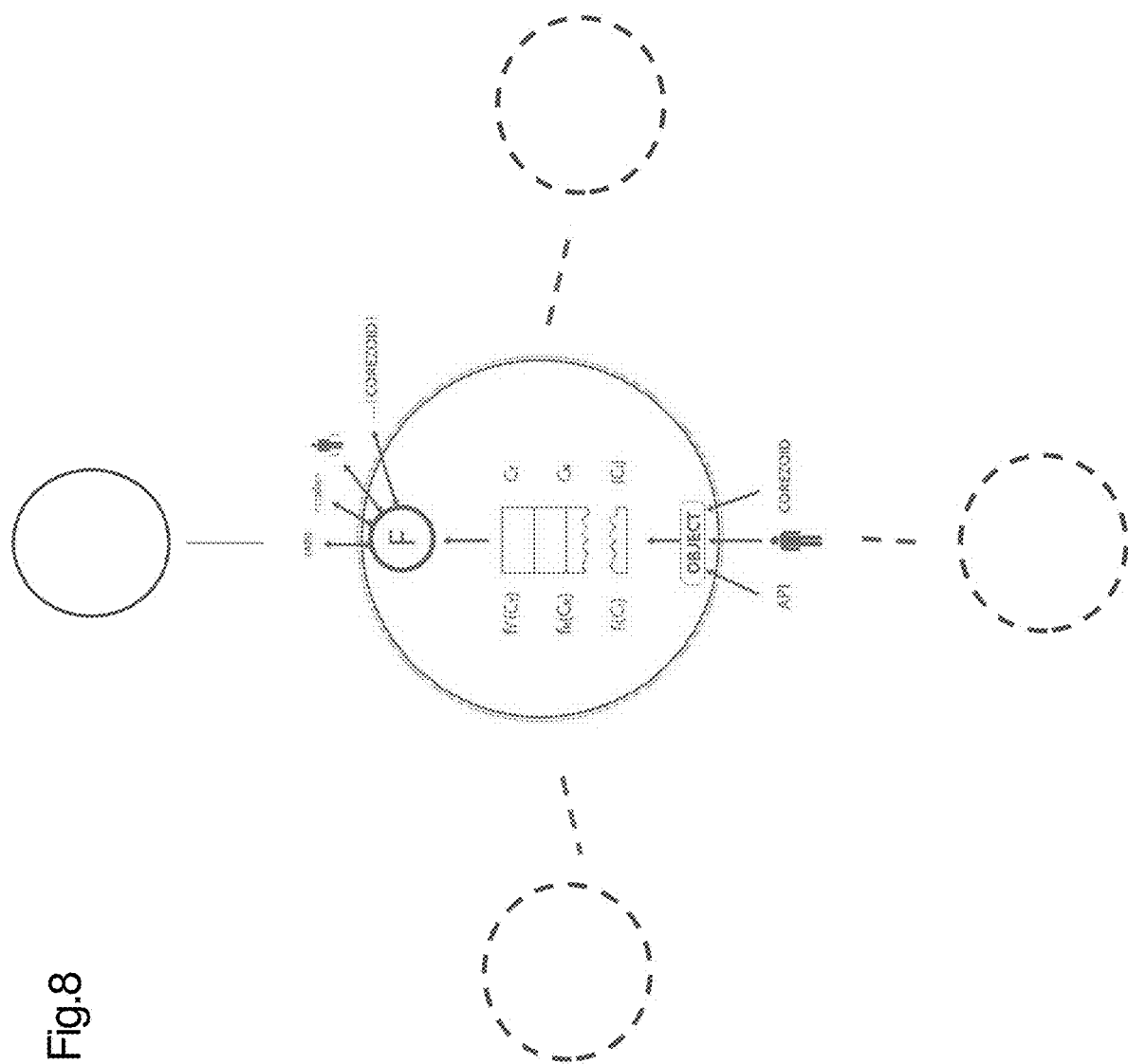
FIG. 8 illustrates schematically the Universal Computing Element (UCE or COREZOID) structure in a node configuration, according to one or more aspects of the present invention.

Now in reference to FIG. 8. FIG. 8 illustrates an exemplary schematic of the Universal Computing Element (UCE) structure in a node configuration, according to one or more aspects of the present invention. The node configuration of the UCE in a network of nodes is a significant improvement of the automated task flow by enabling perpetual shuttling of objects from a node to at least another node. This perpetual shuttling persists until at least one of a condition with a set of parameters is met by the event or a counter/time limit is met. In the instance the event obligation is met and satisfied, the task is executed as prescribed. In the event at least one of counter limit or time limit is met, the task loop is terminated, thereby ending the process-run. As a result, this node configuration of the UCE and the novel process-run features enable a number of computer processing efficiencies, namely better distributing computational load throughout nodes in a network and avoiding a task-queue overflow.

As shown in FIG. 8, such a node configuration of the UCE, in general terms, is structurally in hardware, firmware, and/or software embodied using one or more processor, computer, controller, etc., and comprises one or more queues, one or more counters, one or more functions from counters (e.g., semaphores), as well as functions applied to queued objects. Initially, information about one or more object may be transferred automatically to the unit queue input (i.e., object identifier—Oi). Such queue may be configured and/or described by standard semaphores and/or counters, e.g., semaphores of time, quantity, etc.

Moreover, according to pre-determined or modified rules and/or parameters, data on one or more object is processed in the UCE unit, i.e., the function is applied to such object. Application of function to such object preferably has defined limitations on time and quantity. Also, such functions can be realized through API, code, conveyor, operator, etc. After successful processing of object data, the unit delivers results for further processing to other units, or processing is completed. In case of deviation from normal operation of the unit (e.g., processing time exceeded, more objects in queue which are waiting for processing, etc.), the unit triggers escalation (e.g., escalation algorithm may deploy additional units). Escalation parameters and conditions can be extended based on needs of one or more algorithm. The UCE in node configuration comprise structural functions and programmable attributes with the same characteristic definitions and nomenclature as described earlier in the FIG. 1 description.

While not shown in FIG. 8, in a preferred embodiment, a system and method for creating a finite state automation using a nodal UCE may comprise a listing of necessary states significant for a data processing; determining data parameters used for designation of necessary states; assembling a data structure and a process (object) corresponding to information about at least one necessary state significant for the process; and running the process involving movement of objects from a node to at least one other node for a perpetual run until a condition with a set of parameters are met by an event.

While in other embodiments, also not shown, after assembling a data structure and a process (object) corresponding to information about at least one necessary state significant for the process; objects are in a perpetual transfer from a node to at least one other node until at least one of two things occur: The condition with a set of parameters are met by an event or prior to the condition being met, a pre-defined threshold of a counter limit or time limit is reached, terminating the process run (task loop).

Alternatively, the task loop may end prior to the condition being met solely upon the counter limit being reached. In another alternative embodiment, the task loop may end prior to the condition being met solely upon the time limit being reached. In yet other alternative embodiments, the task loop may end prior to the condition being met only upon both the counter limit and time limit are reached. Such task loop termination features are intended to avoid a task-queue overflow in a finite-state automation process.

A business process is the most general usage case of the node-based automation platform being described. Generally speaking, a business process is a partially ordered set of tasks aimed at achieving a specific purpose (production of goods, rendering of a service, etc.). In this case, the actions imply simple calculations and conversion of data portions (or records in terms of traditional database management systems), which are in this context called objects. In itself, the automation platform with smart nodes allows to manipulate objects, calculate their number, sum up numerical values in the objects, and so on. In some simple, but nevertheless, important cases, such as regarding many financial business processes, this proves already sufficient. However, the scope of the smart node platform is not restricted to this, as one of the most important tools of the platform is its free interaction with any external applications through the API (application programming interface).

In a preferred embodiment, the processes represent a certain finite number of positions and transitions presented in the form of a set of nodes interconnected with arcs. The arcs define the relationship and sequence of a process. The process is carried out by movement of objects from input positions (nodes) to output positions due to reaction to events, which can come either from external systems (interaction with API) or performance of functions in the nodes during process execution. Alternatively, other signifiers (dotted line, arrow, etc.) may be used to signify the relationship and sequence of a process via the user interface. The user interface may also give a user the option to produce a change of its own processes through an API. This allows implementing not only simple Petri nets, but also adaptive ones, i.e. able to modify the net so as to adapt to processing of new events not previously considered in the system architecture.

While not shown in the schematic of a single node in FIG. 8, the node determines what should be done to an object by means of a linearly ordered set of functions. The nodes can be of four types: starting node, execute node, and final node. In some embodiments, each of the three types of nodes may have subset of nodes, each with a unique structural, functional, or programmable attribute. The starting node is always one for a process and is used to specify the node actually to be the first to be run, as well as serves as a reference point for process debugging and tracing. Similar to the starting node, the final node performs no action, while only recording the fact of an object processing completion in the node. Alternatively, object processing may not require a final node—just a start node and execute node—with object processing information stored in a conventional memory element or remote server. The execute node may further comprise a normal node and an escalation node, which are semantically equivalent. Their differences are relative and introduced for descriptive reasons: these nodes are suggested to be marked with different colors in the user interface. It is thereby assumed that the process developer uses normal nodes to describe the 'normal' course of the process, while using escalation nodes to describe the response to exceptional conditions.

The execute node executes the task upon the condition with the set of parameters are met by the event. In some embodiments, the execute node terminates a task loop upon an expiration of a pre-defined amount of time the process has been running. In this embodiment, the object perpetually transfers from a node to at least one other node until at least one of an event obligation is satisfied and a counter or time threshold is reached.

Every process run requires a function or command. Each function has a tag, or a name that defines the executable command, as well as a set of parameters specific to the command. Functions in the node are ordered and executed in the order they have been recorded, with two functions—Function Counter limit and function Time limit—having priority and being executed first if present in the node and the conditions for their execution are met. These two functions allow you to avoid task queue overflow and avoid infinite hang-up of tasks in the nodes. The Process run is the actual implementation of a business process. Any process has a starting point and an end point, but there also may be permanent processes. Any process can undergo any number of runs, including those initiated in parallel. process run is performed by the node instances. The course of a process can be monitored and traced using indicators (or dashboards).

An indicator is a means for observing and monitoring progress of a process. The following indicators are provided to show the statistics for the period and/or the instantaneous value in real time: The number of tasks incoming to the node; the number of tasks outgoing from the node; the total number of consumed clock cycles; the number of consumed clock cycles selected by the process.

A node instance is a software object having 'free will'. Each node instance is associated with a queue of objects to be processed. Node instances operate independently and asynchronously, as there is no 'supervisor' over them. Synchronization and interaction between node instances occur due to exchange of objects. Each node instance selects the next object from its queue, executes the prescribed functions that may have a spin-off, and subsequently sends the object for processing to another instance's queue, and then immediately proceeds to processing the next object. Thus, nodes form a chain that processes the incoming sequence of objects at the maximum possible productivity ratio.

An object implies passive data structure used to store and transfer information from one processing node instance to another during runtime. Each object is a set of named parameters. A parameter has a name and value, and the value can be both simple type and a nested task with its own parameters and values. Thus, the task is a hierarchical associative memory of "key-value" type.

Figure 9:
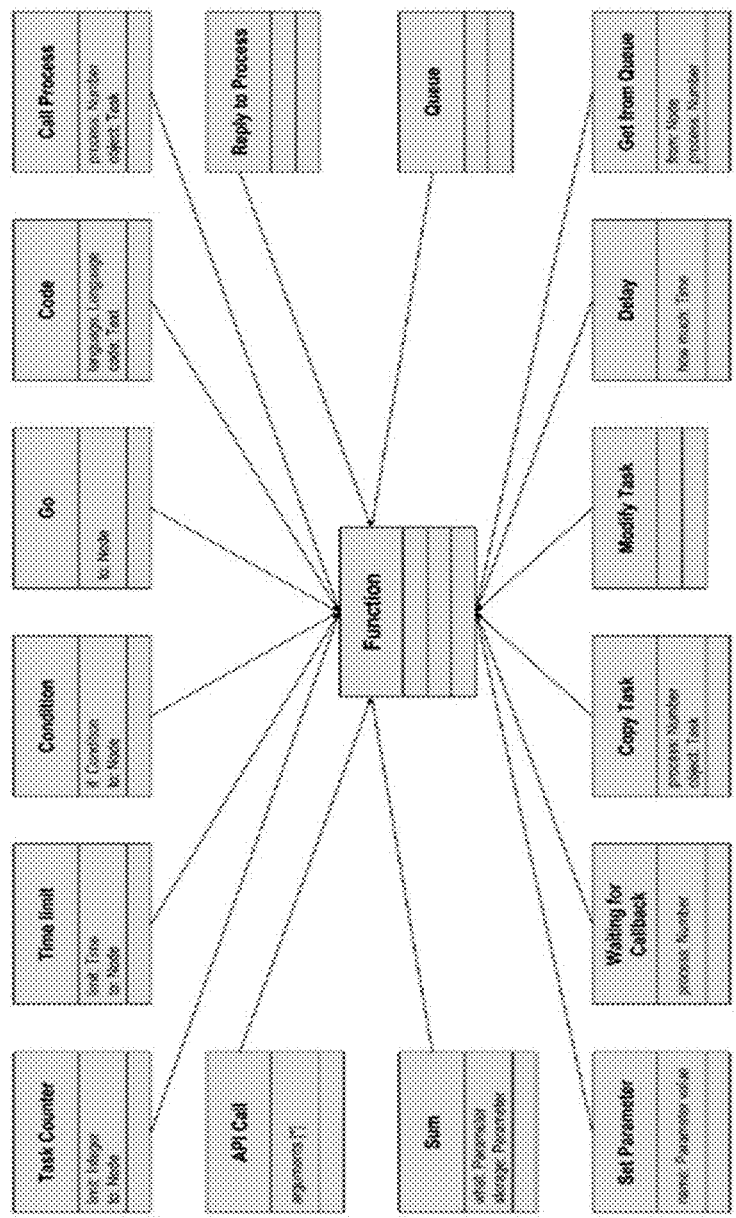
FIG. 9 illustrates the various functions of the nodal configured UCE, according to one or more aspects of the present invention.

Now in reference to FIG. 9, which illustrates the various functions of the nodal configured UCE, according to one or more aspects of the present invention. The various functions are further defined in the below table.

| Name | Description |
| --- | --- |
| Task Counter (Alert when there is task a queue) | If the time of the object presence in the node exceeds the maximum time, the object is transferred to the target node |
| Time limit (Limit the time of the task in the node | The object is unconditionally transferred to the target node. It is the last command of the processing program |
| Go | The condition is a conjunction in terms of comparing values of parameters of objects with the constants. If the condition is met, the object is transferred to the target node |
| Condition | Synchronous call of an external API method in JSON, XML, SOAP formats. The object remains in the node while the API method is being executed. |
| API Call | Synchronizing with an external process. The object remains in the node, until a response from the external process arrives |
| Waiting for callback | Specified language (JavaScript or Erlang) code fragment is interpreted. Accesses the object parameters via the variable data. |
| Code | The object may be partially copied to the starting node of another process |
| Copy task | The object may be partially copied to the starting node of another process, thus causing processing of this object by another process. Once processing is complete, the called object must return the processed object by command RPC_REPLY. |
| Modify task | The object is returned to the calling process. The process ID is stored in the node. |
| Call process | Values of certain parameters are summed up |
| Reply to process | A value is set to the object parameter. |
| Sum | The current object is transferred to the local queue. |
| Set parameter | process name, node name |

Figure 10:
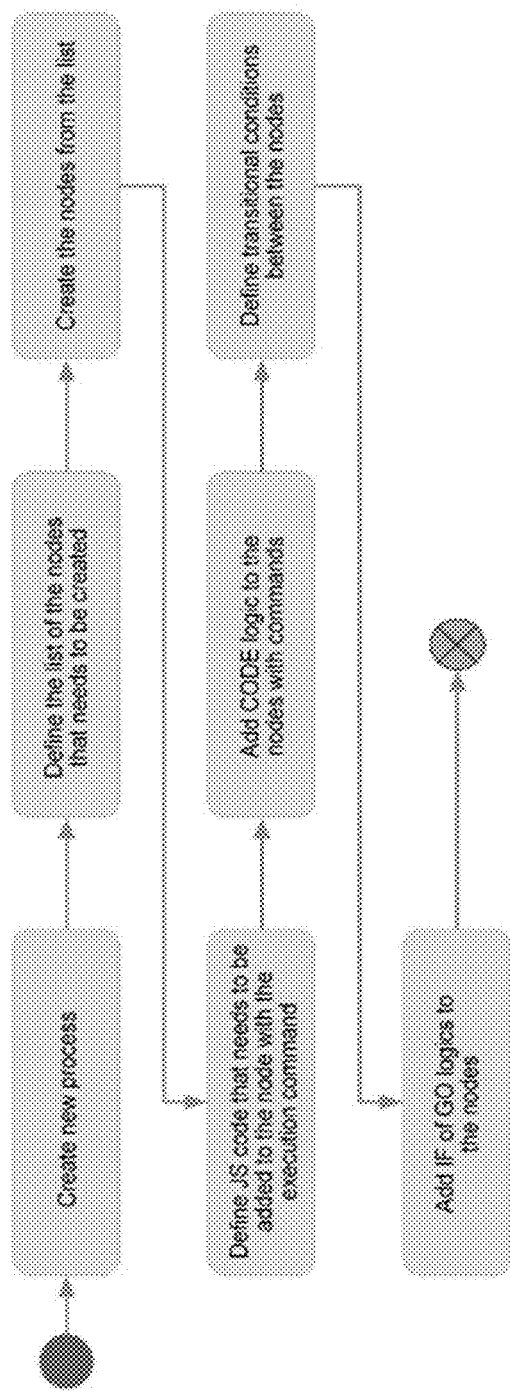
FIG. 10 illustrates a process flow of the nodal configured UCE, in accordance with one or more aspects of the present invention.

FIG. 10 illustrates a process flow of the nodal configured UCE, in accordance with one or more aspects of the present invention. More specifically, the point of input accepts text command messages and synthesizes it into executable workflow based on the following steps: Create a new process; define the list of nodes that need to be created; create the nodes from the list; define the code that needs to be added to the node with the execution command; add code logic to the nodes with command; define transitional conditions between the nodes; and add "if" or "go" logic to the nodes.

Figure 11:
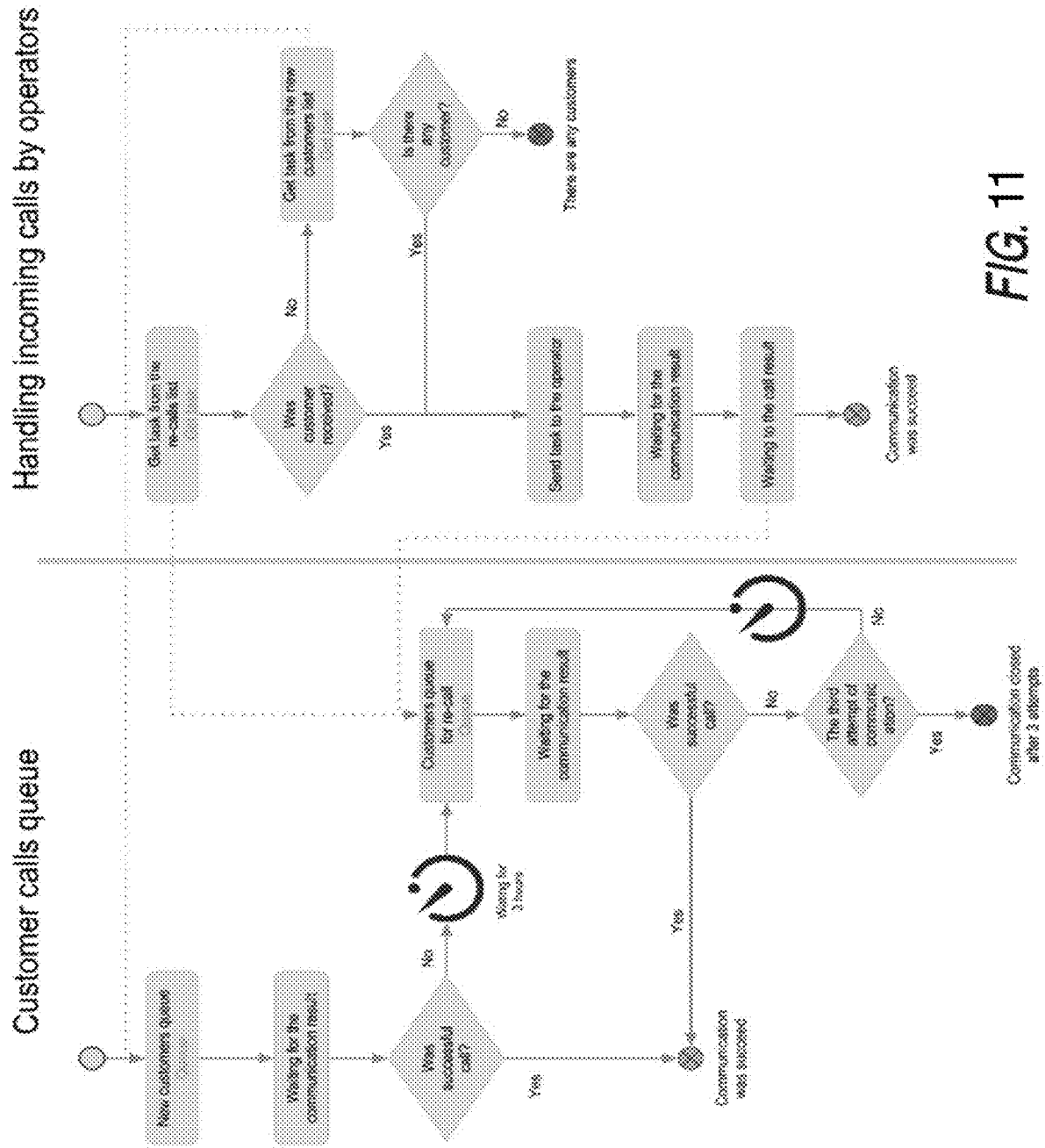
FIG. 11 illustrates a process flow of the nodal configured UCE, in accordance with one or more aspects of the present invention.

FIG. 11 also illustrates an exemplary process flow of the nodal configured UCE. More specifically, FIG. 11 typifies a parallel customer call and incoming call queue process. The example shows the processing of customer calls to a store and the parallel handling of said calls by said store operations. The general scheme of the business process employing the nodal configured UCE is shown in the flowchart on FIG. 11. Shown is a pathway of at least a start node and at least one other node; the at least one node comprising at least a condition function with a set of parameters. In the example of FIG. 11, the condition defined is for a call from a customer to get through to a store operator and the parallel condition is defined as the receipt of the customer call. The object is any data structure capable of storing and transferring information (pertaining to condition name, value, state, etc.) from the start node to the at least one other node; and execute a process run involving movement of queued objects from a start node to at least one other node for a perpetual run until the condition function with a set of parameters are met by an event (customer call received by the store operator). In other embodiments, the process run may end prior to the condition function being met if at least one of a counter limit is met and a time-limit is met in order to avoid the task-queue overflow in the automation process.

Figure 12:
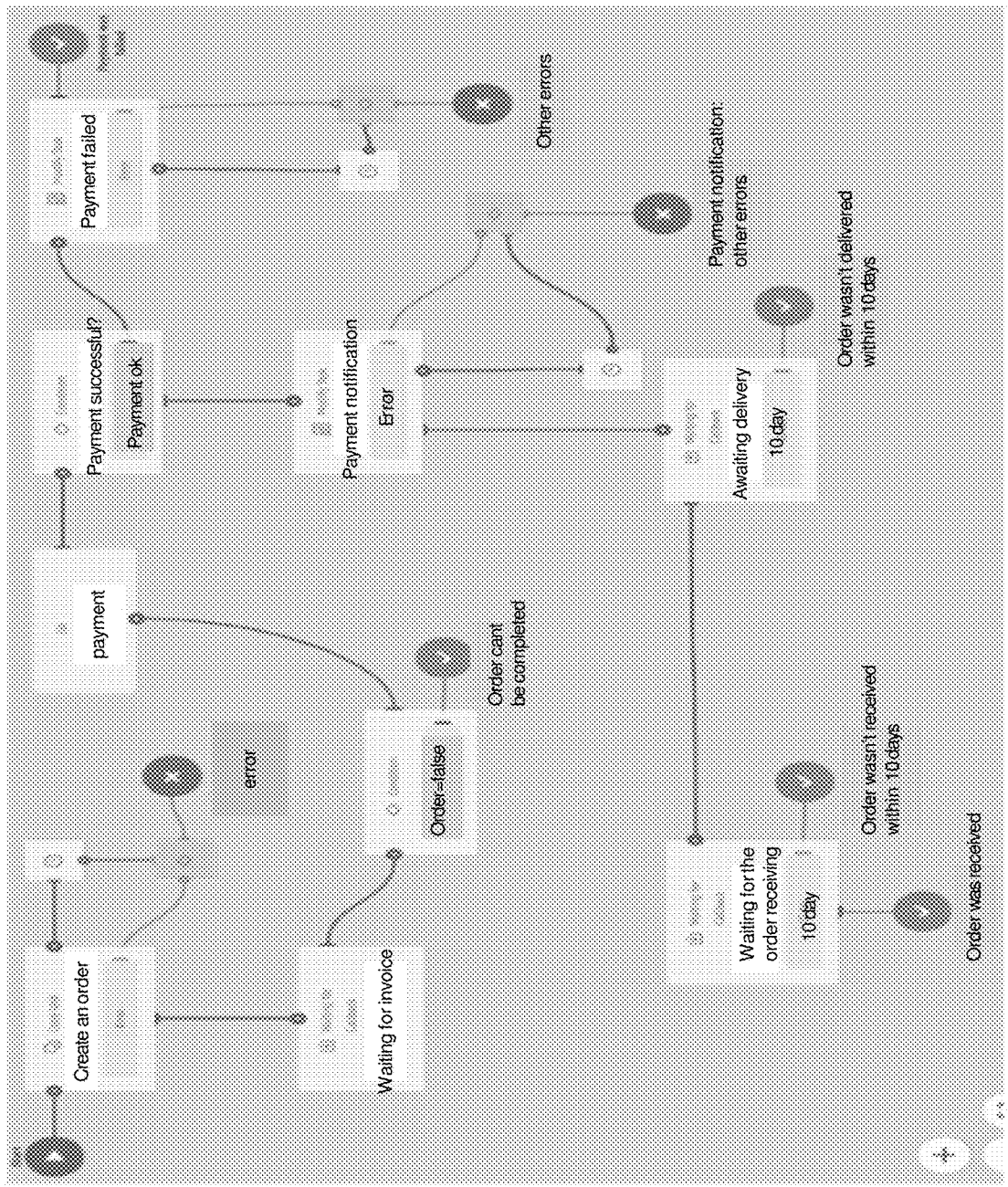
FIG. 12 illustrates a process flow of the nodal configured UCE, in accordance with one or more aspects of the present invention.

FIG. 12 describes interaction of buyers and suppliers in terms of purchase and delivery of goods. The purchase process is initiated by the buyer who places the order. The object 'order' arising on the buyer's side is transferred to the supplier using the Copy task function. The process called does not have to 'know' anything special about the calling process as all the necessary information is available in the object transferred. In other words, the interaction between the processes is performed by means of data rather than by management, thus rendering the processes as independent as possible. Further, the supplier's process after a while responds to the incoming order by means of an invoice. The buyer's process is waiting for the invoice to arrive. This is ensured by the Waiting for call-back function. If the response (invoice) is not received within a certain time with the time set on the buyer's side, the purchase process will fail. Thus, although there is no common synchronized 'supervisor' of process interaction, no process will get stuck for an infinite period of time.

If everything goes correctly and the invoice arrives on time, this is confirmed by modification of the original order on the buyer's side. This means that the invoice is created not as an object separate from the order but is inherently linked to the specific order. Thus, the process allows to automatically eliminate errors such as 'order number confused' and 'this is some other buyer's invoice'. Note that here the case is taken into account where the supplier can refuse to complete the order for their own reasons (for this purpose it is sufficient for the supplier to set the parameter order==false in the order). Further, payment for the goods is made in a perfectly symmetrical manner, with the supplier now acting as a waiting party. The payment order is also created not as a separate object, but as one associated with the original order, which dramatically reduces the probability of errors and fraud. The same pattern is used for interaction in terms of supplying goods, after which the process ends at the same point where it had started, and the object 'order' completes its life cycle.

Figure 13:
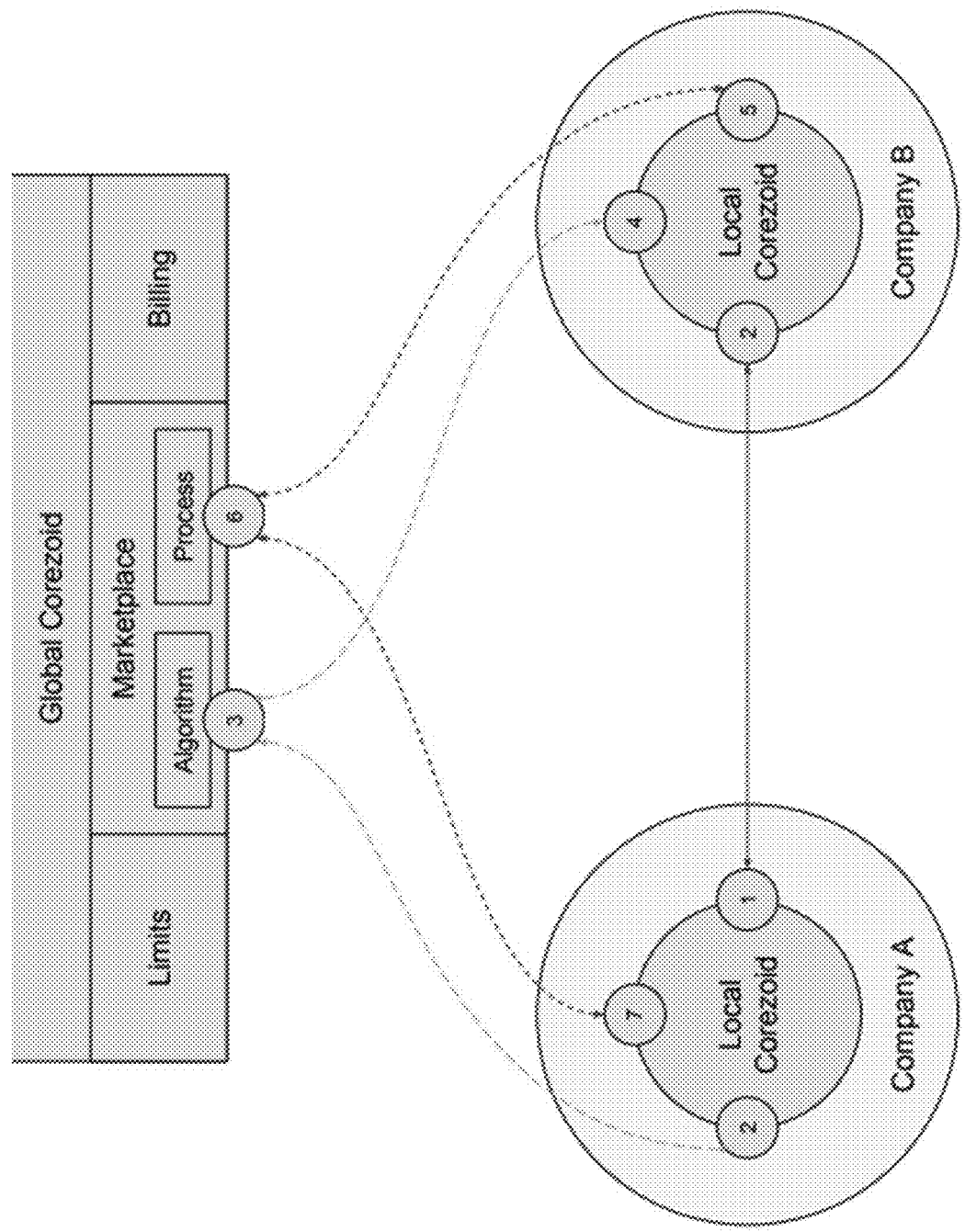
FIG. 13 illustrates an exemplary environment illustrating the extent of interaction between companies employing the node-based finite-state task loop.

FIG. 13 illustrates an exemplary environment illustrating the extent of interaction between companies employing the node-based finite-state task loop. The key advantage of this embodiment is that companies may communicate with any number of companies using a standard protocol, without the need of an API. The limitations of the API are that there are disparate formats making communication complex.

Communication and the extent of interaction may encompass at least one of the following interactions: peer-to-peer connection; peer-to-peer connection with algorithm hosting with a marketplace; peer-to-peer connection with algorithm hosting and process hosting; algorithm hosting without peer-to-peer connection; process hosting without peer-to-peer hosting; and finally, algorithm and process hosting without peer-to-peer interaction.

In a preferred embodiment, process hosting 5-6, 6-7 links access to the process in a marketplace by companies with established limits. Algorithm hosting 2-3, 3-4 loads the algorithm into a marketplace with the setting of limits to use the algorithm.

Third parties may copy the process to its local companies with the established limits. These third parties are companies that use the resources of at least one of the companies with the established limits, but do not own the resources. The companies, in contrast, with allocated resources have direct access to the marketplace (algorithms and process). In some embodiments, the companies have direct access to the marketplace and with at least one other company with established limits. As a result, communication (data exchange in terms of nodal-based object transfer) may be achieved using a standardized and format-agnostic protocol (contrasting the conventional API-exchanged data). Alternatively, communication or transfer of data may be achieved by an API interface. In alternative embodiments, the object transfer or data transfer may be achieved without the above mentioned perpetual node configured network, but rather through a stage-to-stage manner after a state transfer or change.

The marketplace is a resource with a catalog of voluntarily published limited and, or publicly available resources of companies (algorithms and processes). As noted earlier, the process is the perpetual transfer of objects from one node to another until an event satisfies an event obligation, or upon a pre-defined counter time or limit is reached-avoiding a task queue overflow. Visually, the process is depicted as a graph where vertices are nodes connected by oriented hedges. The goal, of course, being the execution of the implemented graph with an avoidance of task-queue overflow. The algorithm is an instance of the process published in the marketplace, which third parties can copy for further modification and launch of the node-based finite-state task loop.

Alternatively, there may not be a single resource or module cataloguing the algorithms, processes, and other voluntarily published or publicly available resources (marketplace), and rather, each of this data or assets may operate in distinct and independent modules or resources for access by companies or third-parties.

Figure 14:
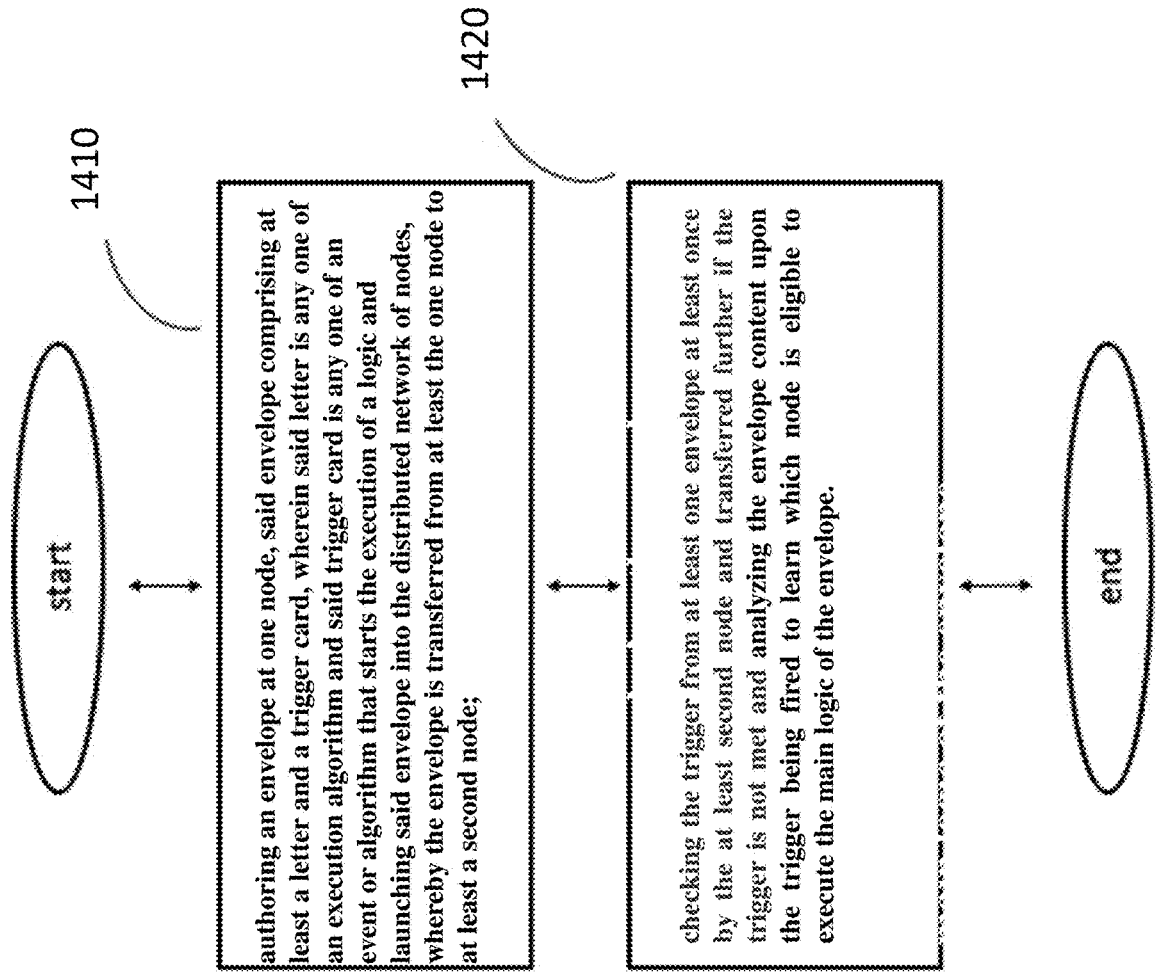
FIG. 14 illustrates an exemplary method flow diagram of the resource-saving exchange protocol based on a safe transfer of trigger-ready envelopes among distributed nodes.

FIG. 14 illustrates an exemplary method flow diagram in accordance with an aspect of the invention. Shown are the two critical steps enabling a resource-saving exchange protocol based on a safe transfer of envelopes among distributed nodes. In a preferred embodiment of the system or method, step 1 entails the system authoring an envelope at an origin node, said envelope comprising at least a letter and a trigger card, wherein said letter is any one of an execution algorithm and said trigger card is any one of an event or algorithm that starts the execution of a logic; and launching said envelope into the distributed network of nodes, whereby the envelope is transferred from at least one run-node to at least a second run-node according to an embedded exchange logic for safe transfer 1410. Step 2 entails checking the trigger from at least one envelope at least once by each run-node and transferred further if the trigger is not met and disabling trigger checking functionality of any one of nodes not actively checking for triggers to save resource; and analyzing the envelopes content upon trigger being fired to learn which run-node is eligible to execute the main logic of the envelope (execute-node) 1420.

Alternatively, in yet another embodiment, the resource-saving exchange protocol may feature envelopes (with trigger card and letter) transferring among distributed nodes and executing logic upon a trigger being met, without comprising embedded logic and other safe transfer features for the safe transfer of envelopes among nodes. In this alternative embodiment of the resource-saving exchange protocol based on a transfer of envelopes among distributed nodes, the system or method comprises the steps of: First, authoring an envelope at one node, the envelope comprising at least a letter and a trigger card, wherein said letter is any one of an execution algorithm and said trigger card is any one of an event or algorithm that starts the execution of a logic; and launching said envelope into the distributed network of nodes, whereby the envelope is transferred from at least the one node to at least a second node. Finally, checking the trigger from at least one envelope at least once by the at least second node and transferred further if the trigger is not met and disabling trigger checking functionality of any one of nodes not actively checking for triggers to save resources; and analyzing the envelopes content upon trigger being fired to learn which node is eligible to execute the main logic of the envelope.

Figure 15:
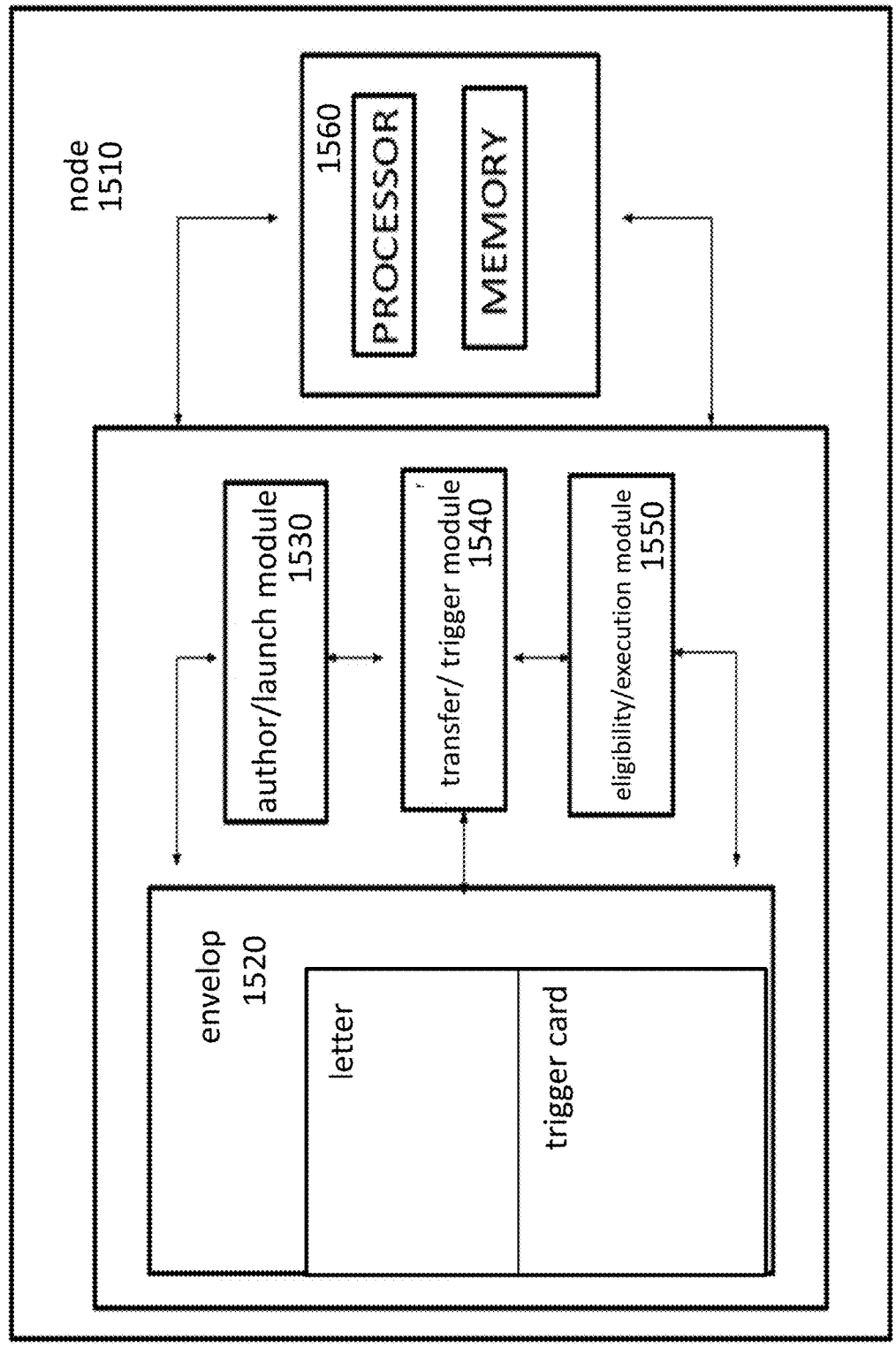
FIG. 15 illustrates an exemplary system block diagram of the resource-saving exchange protocol based on a safe transfer of trigger-ready envelopes among distributed nodes.

FIG. 15 illustrates a system block diagram of the resource-saving exchange protocol. The key feature of the envelope transfer scheme vis-à-vis resource saving is that nodes 1510 that are not currently checking triggers to enable any automated workflow sequence, are momentarily disabled just in terms of their trigger checking functionality. While other functionality of the nodes may be enabled, by disabling the trigger checking functionality, tremendous resource efficiencies may be achieved. This enhanced exchange protocol employing trigger checking disablement during envelop transfer among nodes leads to improved resource efficiencies by streamlining intra and inter-network data transfer. This network optimization, in turn, leads to removed bottlenecks and redundancies in the workflow sequence and improved business outcomes. The node 1510, shown in FIG. 15 as the all-encompassing block, is illustrated to show its inter-relation with the envelope 1520 (with letter and trigger card), processor and memory element 1560, and in some embodiments, modules for facilitating the authoring/launching 1530, transferring, checking 1540, and analysis of the envelopes content upon a trigger being fired to learn which node is eligible to execute the main logic 1550. Alternatively, a system diagram of the resource saving exchange protocol may not comprise distinct modules for enabling the authoring/launching, transferring/checking, or analysis. Instead, alternatively, all of these sub-routines may be performed by the processor/memory element of the system.

In continuing reference to FIG. 15, the node 1510 may be a combination of hardware and trigger cards software or firmware which becomes a part of distributed event processing network. The distributed network may be a sum of all hardware nodes 1510 running trigger cards software. Their logic (embedded in the envelopes 1520, nodes 1510, modules 1530/1540/1550, or processor/memory element 1560) allows them to connect, message, exchange and forward messages and data seamlessly between themselves when triggered and executed upon. In some embodiments, an envelope exchange logic may further be embedded in every node that allows safe envelop transfer between independent nodes without loss, corruption or denial-of-service related events. Furthermore, in some embodiments, the node may additionally be embedded with an envelop exchange logic that transiently or momentarily disables trigger checking functionality exclusively of any node not checking a trigger of an envelope. Alternatively, this transient or momentary trigger checking disablement may be achieved by any one of, or combination of, the trigger/transfer module 1540 and, or the eligibility/execution module 1550. This node-node envelop transfer scheme creates constantly-flowing streams of data within the network. This node-node envelop transfer scheme with transient trigger checking disablement and safe transfer enhancements allows for a safe and efficient flow of data within the network.

In continuing reference to FIG. 15, the envelop 1520 is a base data structure in the network. The envelop consists of at least two main parts: a trigger (event or algorithm that starts the execution of main logic), and a letter (main execution algorithm of any complexity). These parts are combined upon authoring at an origin node and are launched into the network and processed according to the logic within. In some embodiments, a stamp (cryptographic envelop identifier that ties it to a certain payment made to the network for processing this logic) may be comprised within the envelop, in addition to the letter and trigger card.

As shown in FIG. 15, distinct modules interact with or are embedded in at least one of an envelope, node, or remote server for facilitating the authoring/launching 1530, transferring, checking 1540, and analysis of the envelopes content upon a trigger being fired to learn which node is eligible to execute the main logic 1550. In general, the word "module" as used herein, refers to logic embodied in hardware or firmware, or to a collection of software instructions, written in a programming language, such as, Java, C, etc. One or more software instructions in the modules described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, mobile device, remote device, remote servers, and hard disk drives. In other embodiments, the modules may be clustered into a single, centralized core, serving to execute logic.

It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks.

Figure 16:
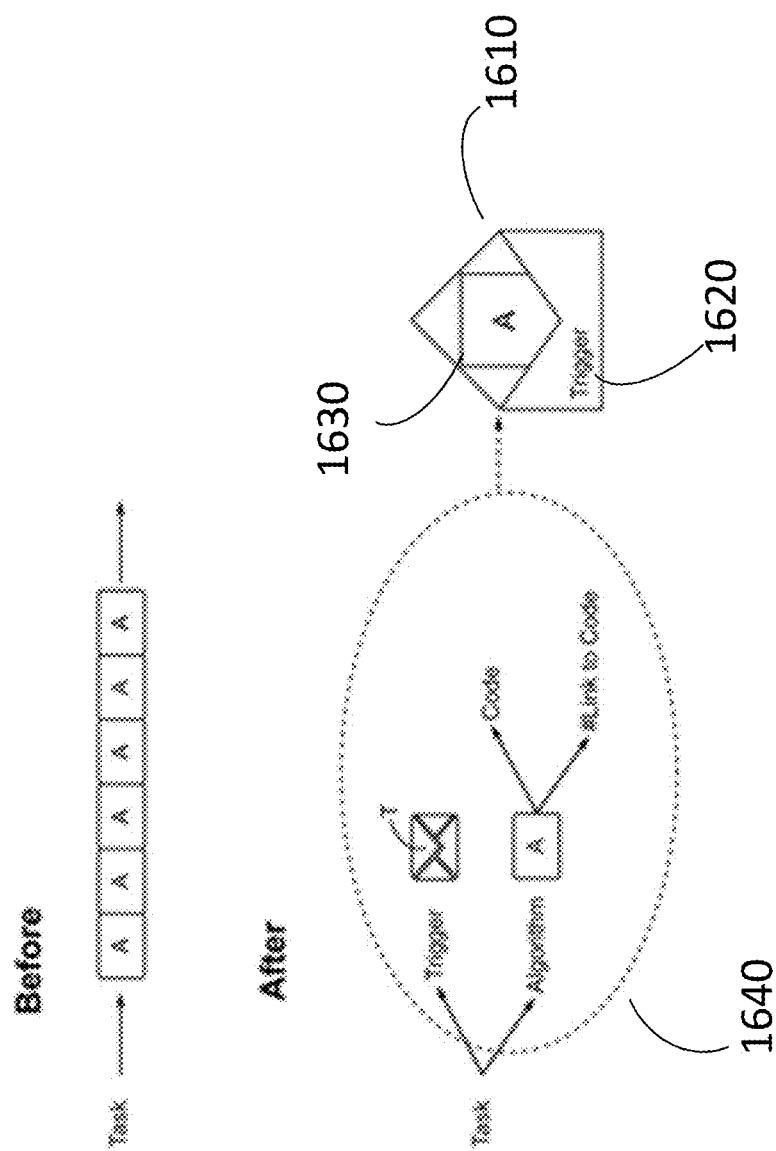
FIG. 16 illustrates schematically a trigger-ready envelop in accordance with an aspect of the invention.
Figure 17:
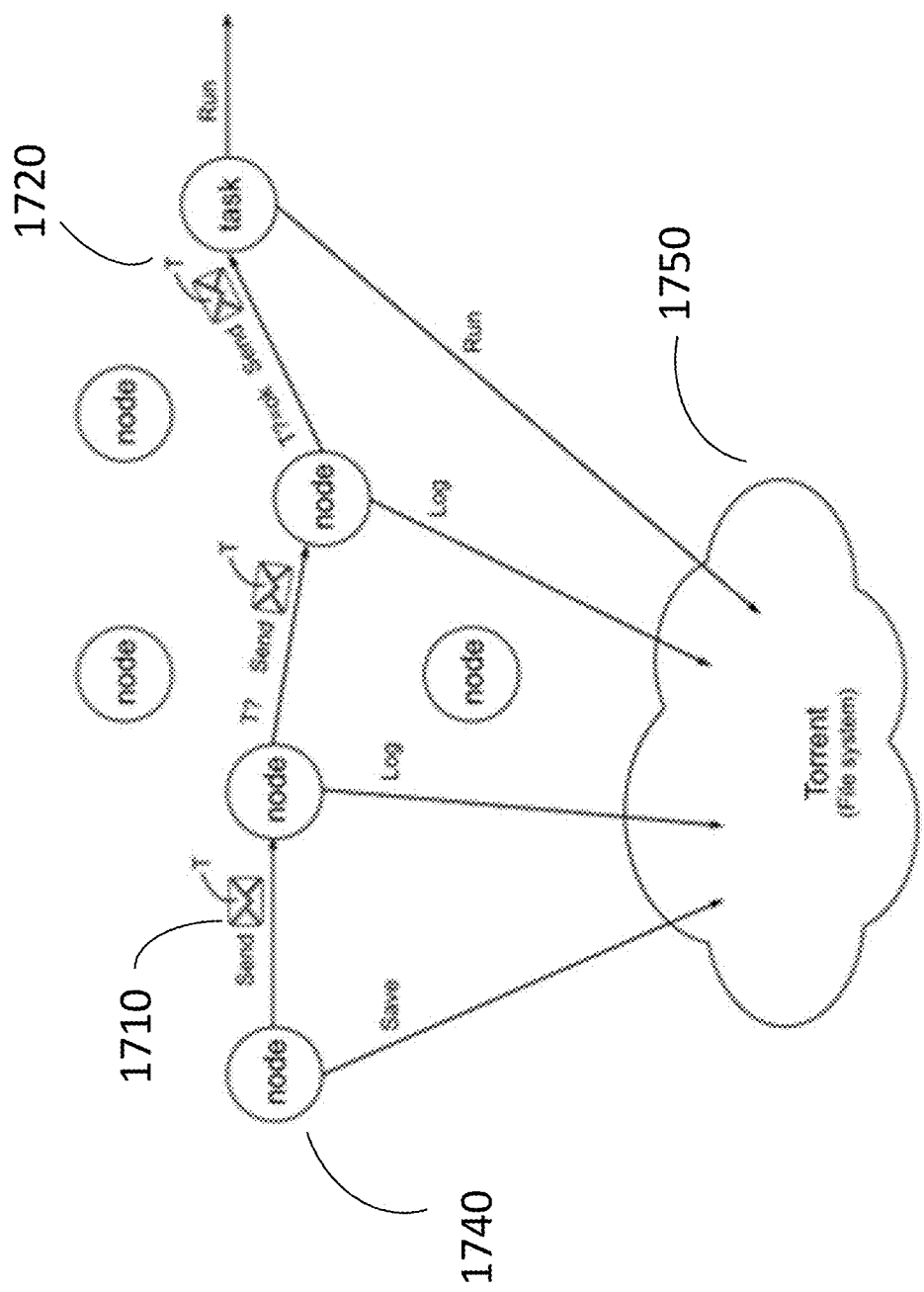
FIG. 17 illustrates schematically a resource-saving exchange protocol, including the trigger-ready envelop and distributed nodes in accordance with an aspect of the invention.

Now in reference to FIGS. 16 and 17. FIG. 16 illustrates schematically a trigger-ready envelope in accordance with an aspect of the invention. FIG. 17 illustrates schematically a resource-saving exchange protocol, including the trigger-ready envelope and distributed nodes in accordance with an aspect of the invention. This new computing and data distribution approach is based on physical multilevel distributed network. The computing process is separated into event-triggers 1620, 1720 and processing algorithm 1630 which is called into action by the trigger 1620, 1720. Trigger cards 1620, 1720 composing a combination of trigger 1620, 1720 and algorithm 1630 together in an independent envelope 1610, 1710 allows it to launch into the network 1750 for perpetual transfer between nodes 1640, 1740 and computing the trigger 1620, 1720 until it fires. Alternatively, the trigger card (trigger)1620 and algorithm 1630 may be distinct, yet packaged together in the envelope 1610, 1710 to be launched into the network 1750.

The lifecycle of an envelope 1610, 1710 consists of time traveled between nodes 1640, 1740 and processed within a node 1640, 1740, which allows the envelope 1610, 1710 to distribute computation load (additional resource efficiency), preserve its state, and execute the underlying algorithm 1630 which finalizes the envelopes 1610 life. The main idea of the solution is to distribute event processing allowing to build unlimited-capacity event-triggered algorithm processing. Existing centralized systems are limited by their nature, demanding more infrastructure and maintenance with an increase of events that are to be processed. The trigger card (resource-saving exchange protocol based on a safe transfer of envelopes among distributed nodes) solution is a distributed solution which utilizes already existing hardware, with almost no additional requirements for it. Installed on several internet-connected nodes 1640, 1740, the solution creates a distributed network of peers which use special data- and message-exchange protocol to create, forward and process event-triggered algorithms.

The network 1750 may be any type of network 1750 that is capable of transmitting or receiving data to/from/between nodes 1640, 1740 (user/client devices: computers, personal devices, wearable device, fixed sensing device (home Internet-of-Things based), mobile sensing device (automotive based), tablets, mobile phones, land-based telephones or any other electronic devices). Moreover, the network 1750 may be any suitable wired network, wireless network, a combination of these or any other conventional network, including any one of, or combination of a LAN or wireless LAN connection, an Internet connection, a point-to-point connection, or other network connection—either local, regional, or global. As such, the network 1750 may be further configured with a hub, router, node, and, or gateway to serve as a transit point or bridge to pass data between any of the at least networks. The network 1750 may include any software, hardware, or computer applications that implement a communication protocol (wide or short) or facilitate the exchange of data in any of the formats known in any art, at any time. In some embodiments, any one of a hub, router, node, and, or gateway may additionally be configured to receive wearable and, or IoT data, and such data may be integrated, collated, or formatted for behavioral profiling of a user, in order to provide contextual data to satisfy a trigger (satisfaction of a pre-defined parameter).

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks. The computer program instructions may also be loaded onto a computer or other programmable data processing apparatus to cause a series of operational steps to be performed on the computer or other programmable apparatus, to produce a computer implemented process such that, the instructions which execute on the computer or other programmable apparatus provide steps for implementing the functions/acts specified in the block or blocks. In general, the word "node" as used herein, refers to logic embodied in hardware or firmware, or to a collection of software instructions, written in a programming language, such as, Java, C, Erlang, etc. One or more software instructions in the unit may be embedded in firmware. The nodes described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, mobile device, remote device, and hard disk drives.

Figure 18:
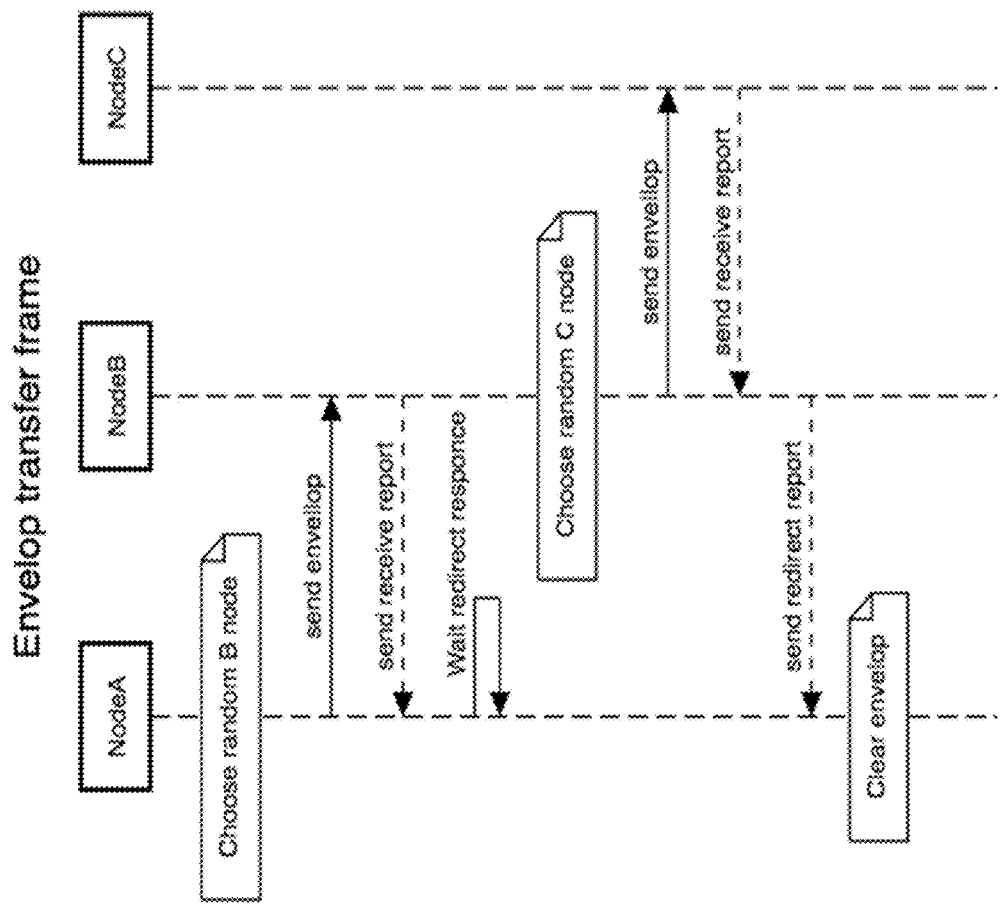
FIG. 18 is an exemplary interaction flow depicting the safe transfer of trigger-ready envelop among distributed nodes in accordance with an aspect of the invention.

FIG. 18 is an exemplary interaction flow depicting the safe transfer of trigger-ready envelop among distributed nodes in accordance with an aspect of the invention. The main exchange protocol within the network is based on envelopes which consist in three parts (see FIG. 16), which transfer all the data, logic and triggers across the network. Origin node (author) creates envelope and launches it into the system, basically transferring it to the next node where its trigger is checked and transferred further if the trigger requirement is not met yet. The lifecycle of an envelope consists then in transferring between nodes which check its trigger and pass it forward. This behavior grants several benefits: (1) state of constant transfer is safer for an envelope as nodes can go offline or be disabled, triangulation mechanism ensures that the envelope safely passes through; (2)

each node checks trigger once, thus allowing processing of multitude of envelopes even on slow or outdated hardware. trigger logic can be quite heavy and resource-consuming; (3) each node verifies the integrity of an envelope preventing alteration or exploitation of it.

While not shown, one of the key elements of the envelope enabling the resource-saving and safe transfer is the trigger card. The trigger card has the following functionality: content-addressing of any file by multihash; message exchange between any nodes; sharing storage for files between peers; and search and retrieval of any content within network. The resource-saving exchange protocol solution featuring transferring envelopes with trigger cards create the following outcomes: envelopes are guaranteed (with certain limitations) to be delivered despite most forms of restricting circumstances: node being offline, node going offline during exchange, node making attempt on envelope's 'life', network segmentation and so on.

In a preferred embodiment, the network will make all possible steps to preserve envelope and to deliver it to the receiver. The ipfs's content addressing further ensures the envelope can not be altered or tampered with. The envelope needs only a public key of a recipient to be successfully delivered, the network will determine the way to deliver it safely and automatically without the need to provide an address or any type of routing information. Cryptographic features of trigger cards absolutely guarantee that envelope will not be compromised, improperly delivered or leaked. Each node can process multitude of envelopes without the need in specialized hardware allowing many computing devices to be included in the network like mini-computers, notebooks, routers, smart-devices etc. Every device with processor is able to be part of the network and process envelopes making the network capacity bigger. The software can be installed on any device with a supported processor further allowing to create a vast network based on devices that aren't suitable for cloud computing, aren't used for anything but their main (narrow) purpose. It also makes each device able to communicate independently via a standardized protocol among themselves and with users. All devices can find each other via the network without any prior knowledge about one another, and will exchange with their peers and expand their peer swarm automatically.

As shown in FIG. 18, transferring envelopes uses a triangulation algorithm where three nodes act as processing parts: node A is memory, node B is the processor, then B becomes memory and C processor and so on. This allows safe transition of an envelope, failure to complete any of the stages or even two doesn't stop the transfer. This scheme can be expanded by any number of nodes to increase stability: Ipfs-nodes provide means for traversing multiple layers of NATs, broadcasting and relaying messages and data making nodes accessible in complex and restrictive network conditions. This scheme adds to that ability of UDP-TCP hole punching and some other moves to make sure each node is accessible from the outside world directly or via relay effectively transforming each node into a server instance. With a combination of content-addressing, public-key-only ID (and built-in data encryption) and (in)direct network availability, this allows to replicate conditions of a traditional server network without any actual servers. As such, with enough number of nodes, the processing power of the network can exceed any known server cluster without the need to maintain or even own any server. Each node thus is able to use this power to its own liking providing a part of its own processing time—only requiring an internet connection.

While not shown in FIG. 18, the Core (encompassing the above described modules), preferably is written in golang, and preferably coordinates all aspects of network exchange, envelope processing, routing and logic. It is universal across devices and can be installed on any supported machine. It implements an API which allows outside control of the node via different interfaces. The Core can be installed in one place and controlled from the other. It's important to note that the Core can be controlled, but doesn't require to be controlled in order to operate. The Cores functions are automated and it can serve the network without outside commands as an automated node.

While also not shown in FIG. 18, nodes are known to each other only by their public keys, this only identifier allows to find any given node, encrypt data for that node only and authorize that data for node authorization via a digital signature. As an effect, we are able to encrypt data by default for all transactions making all network exchange encrypted and secure. Any information including transport metadata is encrypted for the specific recipient(s) and thus is protected from abusing by the relay nodes. Any sensitive data stored inside envelope is encrypted by default, any transport information too. However, there are certain limitations to the encryption as a result of processing supremacy: Triggers, source, and executor information are passed without encryption because network nodes need this data to process it correctly.

In a preferred embodiment, each envelope contains at least a trigger that signals execution of the main logic. While traveling between nodes these triggers are checked. The Core allows for any trigger logic complexity and has means to create almost any trigger either with standard options or custom coded logic. For instance, user-defined time and event parameter (via an API-call) selection via drop-down menus allows one to create any number of triggers, while the core will accept the compiled or raw erlang code, which is platform-independent and will be executed on any supporting machine the same way. Any node can check a given trigger because the Core provides built-in support for an erlang virtual machine. In other embodiments, distributed modules, each with dedicated functionality (providing built-in support for an erlang virtual machine, for instance) may be involved in executing the sub-routines as described above, rather than a clustered Core.

In a preferred embodiment, If the trigger is fired, the node will analyze envelope's content to learn which run-node is eligible to execute the main logic. After that, it will transfer this signal to a run-node which will check trigger context and envelope integrity and proceed to execution of the main logic of an envelope. In cases where the trigger is not yet fired, node will route the envelope further. Alternatively, upon a fired trigger, run-node eligibility for executing the main logic may be unnecessary for any node may execute the main logic of the envelope.

Figure 19:
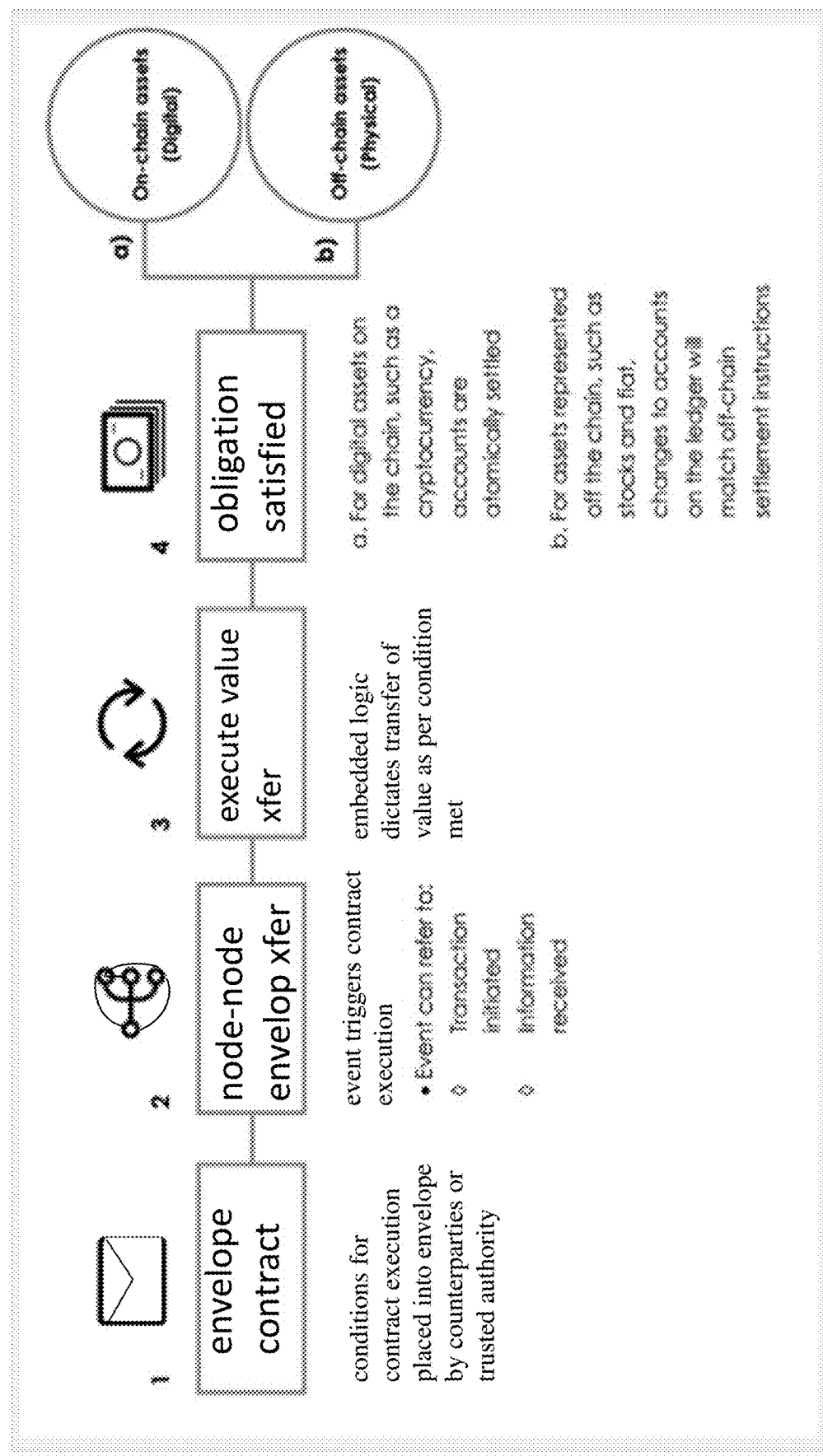
FIG. 19 illustrates an exemplary smart contract implementation of the resource-saving exchange protocol in accordance with an aspect of the invention.

Now in reference to FIG. 19. FIG. 19 illustrates an exemplary smart contract implementation of the resource-saving exchange protocol in accordance with an aspect of the invention. As illustrated, in a smart contract implementation, trusted run nodes may execute the main logic when requested and are not involved in processing trigger checks for this envelope, off-loading the trigger checking to the network. Run nodes are not hard set, rather it is an envelope-specific role which can reconfigure dynamically in response to certain network events. Individual nodes become eligible as run nodes in a smart-contract implementation when:

The network is made aware that this node is marked as trusted for general use by some trusted authority. This means that node has good stats, is responsive and executes envelopes correctly. any node can include it in it's run-node list for an envelope if it chooses to.

The envelope creator marks particular node as it's executor for any reason thus making it run node for this specific envelope. Basically, a run node is a dynamic functional property which indicates that the node is bound to execute certain logic. Nodes use the same method for executing envelopes as for processing triggers: they evaluate and execute the code they receive inside the erlang virtual machine. While running within the virtual machine, the code in question is limited in scope to that environment and cannot transcend the environment without interaction with a set of interfaces. Core enables the virtual machine to use network-specific methods from inside the process like reading and writing to distributed registries, creating and sending new envelopes, calling other network-specific actions.

Certain logics require to be executed only once (execution singularity), which may be a problem in a distributed network. Typically, there are few executors assigned to each envelope in order to maximize the stability of the execution process. In order to decide which node will be executing the logic they start gathering consensus. Before execution, nodes exchange information about their status and select one executor which then is granted the authority to manage and execute this envelope. Registry record is made and local state of the execution is written within participating nodes. The chosen node proceeds to execute the logic and reports back to the creator with successful result. Failing to achieve a success, the node may try to repeat execution and, or proceed to transfer execution right to another node or simply return to the source with failure a code.

Conventional smart contracts, such as Ethereum, can not be based on outside-the-network events. The claimed invention provides all necessary accesses and keys for the run node to be able to independently execute action on the smart contracts behalf. Once created, the smart contract is shared to the network and can not be altered (content addressing doesn't allow underlying data change) and the run node cannot be prevented from executing the logic when the trigger fires.

Smart contracts are tied to registries as well, as they implement the logic which can be followed when writing it to the registry. The node can execute outside logic by it's smart contract ID without any prior knowledge of it the same way across the network as the code execution is isotropic within the network.

Smart contracts include following types:
  one-sided: node creates and pushes logic to the network to reuse, the logic is signed and authorized by the node. This is useful when writing registries, filling out data forms, processing information, serializing algorithms, etc.
  two-sided: logic is created by two parties and signed by both to be executed by the network, usually meaning that all the code is encrypted and can't be accessed as such by anyone outside trusted executives. The network only provides trigger processing and code execution.

Each smart contract has to be supplemented by the author with a valid payment stamp, generated by the system. Nodes processing it will write a smart contract ID to their internal logs and will be able to request compensation from the system for processing.

The following features: Content addressing, innate encryption, stateless and safe transport protocol and arbitrary code-execution, are core to the resource-saving exchange protocol. These features open the possibility to a variety of smart implementations:

Distributed Registries

This implementation allows distributed storage and update of complex registries managed by many entities. Nodes can write certain data conforming the structure of the registry, to the network, and then can also read changes made from other nodes. Creator of the registry links it to a certain master key and manages registry meta-data, such as, name, data structure and those who can write into the registry. He also can grant and revoke rights for the keys. The registry itself is stored across the network and nodes have the logic to seamlessly propagate changes made to registries they have subscription to. Essentially, this is database which requires no cost to maintain, yet can be controlled and requested from the network without any reliability issues are there can be millions of nodes providing data for the registry. Currently, this implementation is somewhat restricted by underlying technology: registries are quite slow to read and write as it requires querying multiple independent entities with large data portions.

Distributed Messenger

This implementation allows a distributed messenger system, where nodes freely talk to each other with no mediator, passing encrypted messages and data. The main feature of this messenger would be security:
  No centralization point, you can't shut down or pinpoint users
  No logs, there's no one to keep them, users contact directly
  No tracing, envelope transport systems uses messages relaying, there's no way to know which node is the origin. you pass my messages to someone, I do yours.
  Group chats possible, even without common point of chat state actuality. all users exchange their messages relying on network to propagate data to each user. With certain interface tweaks we can achieve similar to centralized group chats behavior.
  Logs are possible, even though no central storage point is there. your peers keep mutual logs which can be safely requested.

Distributed registries allow to create arbitrary contact lists and manage them as authors as they please. Companies can create registries of employees, share the hash of that registry, then proceeds to request that registry (and/or add himself there) and access his colleagues by their public keys. Create chat and go.

Distributed Documents Exchange

With respect to this implementation, the same logic for the distributed registry applies for a distributed document exchange, with the one important addition of a qualified electronic signature. Users can freely exchange any types of files, and the built-in cryptographic modules allow to use your own state-issued ID keys sign documents. This implementation can be used to exchange legal documents within any circle, defined by the registries you are subscribed to. The same way group chats users are able to share documents with others, assign roles for these documents and use it as stateless, distributed, free-of-maintenance document exchange system.

The foregoing descriptions of specific embodiments of the invention have been presented for purposes of illustration and description. They are not intended to be exhaustive or to limit the invention to the precise forms disclosed. Modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

I claim:

1. A resource-saving exchange protocol method based on a safe transfer of envelopes among distributed nodes, said method comprising the steps of:

authoring an envelope at an origin node, said envelope comprising at least a letter and a trigger card, wherein said letter is any one of an execution algorithm and said trigger card is any one of an event or algorithm that starts execution of a logic;

launching said envelope into a distributed network of nodes, whereby the envelope is transferred from at least one run-mode to at least a second run-node according to an embedded exchange logic for safe transfer;

checking a trigger (meeting an event obligation to start execution of the logic) from at least one envelope at least once by each run-node and transferred further if the trigger is not met and disabling trigger checking functionality of any one of nodes not actively checking for triggers to save resource; and analyzing the envelopes content upon the trigger being fired to learn which run-node is eligible to execute the logic of the envelope (execute-node).

2. The method of claim 1, wherein the envelope comprises of at least a trigger (event or algorithm that starts execution of main logic) and a letter (main execution algorithm of any complexity) combined to be launched into a network and processed according to the logic within.

3. The method of claim 2, wherein the envelope further comprises a stamp, wherein the stamp is a cryptographic envelop identifier that ties the stamp or the envelope to a payment made to the network for processing a logic.

4. The method of claim 1, further comprising an envelope exchange logic embedded in every node allowing safe envelop transfer between independent nodes without loss, corruption or denial-of-service related events.

5. The method of claim 1, wherein the run-node not checking the trigger of at least one envelope momentarily disables trigger checking functionality until at least one envelope arrives or returns for the trigger check.

6. The method of claim 1, wherein the run-node checks the trigger of at least one envelope only once prior to transferring to the next run-node.

7. The method of claim 1, wherein the run-node checks any number of envelopes concurrently.

8. The method of claim 1, wherein the run-node is any processor-enabled device.

9. The method of claim 1, further comprising an envelope transfer scheme employing a triangulation algorithm to ensure sate transfer of envelopes from node to node.

10. The method of claim 9, wherein the envelope transfer scheme increases transfer stability as a number of nodes increase.

11. The method of claim 1, wherein the run-node further comprises a public key identifier to locate or verify any sending or receiving node or envelope, exchange in any given transaction.

12. The method of claim 1, wherein the trigger card is created with standard or customized coded logic.

13. The method of claim 1, further comprising transferring the envelope to an eligible run-node once trigger is fired and check trigger context and envelope integrity and proceed to execution of the logic of the envelope.

14. The method of claim 1, wherein the run-node eligible to execute the logic of the envelope (execute node) is dynamic based on network or envelope properties.

15. The method of claim 1, wherein the run-node eligible to execute the logic of the envelope is pre-determined by at least one of a user or trusted authority.

16. The method of claim 1, wherein the exchange protocol is associated with a smart contract, wherein each exchange is executed independently with no alteration or suspension of the envelope logic.

17. The method of claim 1, wherein the exchange protocol is associated with a distributed registry for storing, reading, and writing arbitrary data into a network.

18. The method of claim 1, wherein the exchange protocol is associated with a distributed messenger system.

19. The method of claim 1, wherein the exchange protocol is associated with a distributed document exchange system.

* * * * *